(12) United States Patent
Rozas et al.

(10) Patent No.: US 11,023,622 B2
(45) Date of Patent: *Jun. 1, 2021

(54) PROCESSORS, METHODS, SYSTEMS, AND INSTRUCTIONS TO DETERMINE WHETHER TO LOAD ENCRYPTED COPIES OF PROTECTED CONTAINER PAGES INTO PROTECTED CONTAINER MEMORY

(71) Applicant: Intel Corporation, Santa Clara, CA (US)

(72) Inventors: Carlos V. Rozas, Portland, OR (US); Mona Vij, Hillsboro, OR (US); Somnath Chakrabarti, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,016

(22) Filed: Jun. 29, 2019

(65) Prior Publication Data

US 2019/0325168 A1 Oct. 24, 2019

Related U.S. Application Data

(63) Continuation of application No. 15/274,217, filed on Sep. 23, 2016, now Pat. No. 10,346,641.

(51) Int. Cl.
*G06F 21/78* (2013.01)
*G06F 9/30* (2018.01)
(Continued)

(52) U.S. Cl.
CPC .......... *G06F 21/78* (2013.01); *G06F 9/30145* (2013.01); *G06F 21/57* (2013.01); *G06F 21/6245* (2013.01)

(58) Field of Classification Search
CPC ...... G06F 21/78; G06F 21/57; G06F 21/6245; G06F 9/30145
(Continued)

(56) References Cited

U.S. PATENT DOCUMENTS

| 6,708,274 B2 | 3/2004 | Herbert et al. |
|---|---|---|
| 8,190,914 B2 | 5/2012 | Van Riel et al. |

(Continued)

FOREIGN PATENT DOCUMENTS

EP 2887607 A1 6/2015

OTHER PUBLICATIONS

Shi et al., "Architectural Support for High Speed Protection of Memory Integrity and Confidentiality in Multiprocessor Systems", IEEE, Proceedings of the 13th International Conference on Parallel Architecture and Compilation Techniques (PACT'04) (Year: 2004).*

(Continued)

*Primary Examiner* — Khalil Naghdali
(74) *Attorney, Agent, or Firm* — Nicholson de vos Webster & Elliott LLP

(57) ABSTRACT

A method performed by a processor of an aspect includes accessing an encrypted copy of a protected container page stored in a regular memory. A determination is made whether the protected container page was live stored out, while able to remain useable in, protected container memory. The method also includes either performing a given security check, before determining to store the protected container page to a destination page in a first protected container memory, if it was determined that the protected container page was live stored out, or not performing the given security check, if it was determined that the protected container page was not live stored out. Other methods, as well as processors, computer systems, and machine-readable medium providing instructions are also disclosed.

20 Claims, 15 Drawing Sheets

(51) Int. Cl.
*G06F 21/62* (2013.01)
*G06F 21/57* (2013.01)

(58) Field of Classification Search
USPC .......................................................... 713/193
See application file for complete search history.

(56) References Cited

U.S. PATENT DOCUMENTS

| | | | |
|---|---|---|---|
| 2006/0015753 | A1 | 1/2006 | Drehmel et al. |
| 2006/0173787 | A1 | 8/2006 | Weber et al. |
| 2008/0201540 | A1 | 8/2008 | Sahita et al. |
| 2009/0323941 | A1 | 12/2009 | Sahita et al. |
| 2014/0189242 | A1 | 7/2014 | McKeen et al. |
| 2014/0189325 | A1 | 7/2014 | McKeen et al. |
| 2014/0189326 | A1 | 7/2014 | Leslie et al. |
| 2014/0208111 | A1 | 7/2014 | Brandwine et al. |
| 2014/0281584 | A1* | 9/2014 | Mangalampalli ....... G06F 21/64 713/193 |
| 2014/0297962 | A1 | 10/2014 | Rozas et al. |
| 2015/0033034 | A1 | 1/2015 | Gerzon et al. |
| 2015/0033316 | A1 | 1/2015 | Scarlata et al. |
| 2015/0089173 | A1 | 3/2015 | Chhabra et al. |
| 2016/0117265 | A1 | 4/2016 | McKeen et al. |
| 2016/0149912 | A1 | 5/2016 | Scott-Nash et al. |
| 2016/0378684 | A1* | 12/2016 | Zmudzinski ........ G06F 12/1027 711/105 |
| 2016/0378688 | A1* | 12/2016 | Rozas ................. G06F 12/1441 713/190 |
| 2017/0083724 | A1* | 3/2017 | Chhabra ............. G06F 12/1408 |
| 2017/0302635 | A1 | 10/2017 | Humphries et al. |
| 2018/0007051 | A1* | 1/2018 | Vij ......................... H04L 63/08 |

OTHER PUBLICATIONS

Mahar et al., "Design and Characterization of a Hardware Encryption Management Unit for Secure Computing Platforms", 2006 IEEE, Proceedings of the 39th Hawaii International Conference on System Sciences—2006 (Year: 2006).*

Intel Corporation "Intel Software Guard Extensions Programming Reference", Doc Reference No. 329298-002US, Oct. 2014, 186 pages.

International Preliminary Report on Patentability for Application No. PCT/US2017/049583, dated Apr. 4, 2019, 13 pages.

International Search Report and Written Opinion received for PCT Patent Application No. PCT/US2017/049583, dated Dec. 11, 2017, 16 pages.

Non-Final Office Action from U.S. Appl. No. 15/274,217, dated Apr. 25, 2018, 21 pages.

Notice of Allowance from U.S. Appl. No 15/274,217, dated Feb. 19, 2019, 10 pages.

Rozas . et al., "Platform Migration of Secure Enclaves", U.S. Appl. No. 14/829,340, filed Aug. 18, 2015, 56 pages.

Rozas, et al., "Processors, Methods, Systems, and Instructions to Support Live Migration of Protected Containers", U.S. Appl. No. 14/752,227, filed Jun. 26, 2015, 79 pages.

Vij, et al., "Protected Container Key Management Processors, Methods, Systems, and Instructions", U.S. Appl. No. 15/201,447, filed Jul. 2, 2016, 74 pages.

Extended European Search Report and Search Opinion, EP App. No. 17853653.8, dated Feb. 13, 2020, 8 pages.

* cited by examiner

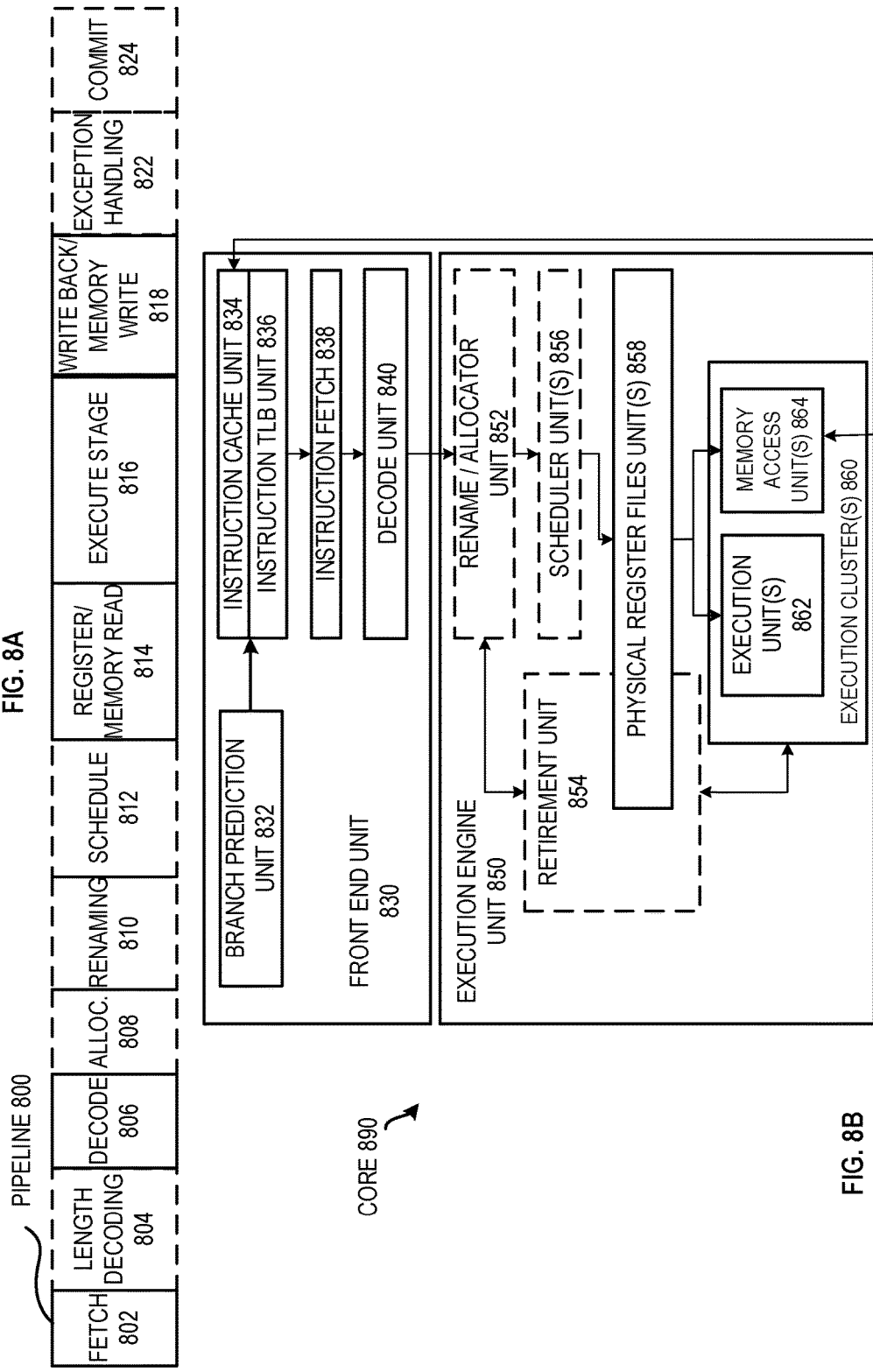

PROCESSORS, METHODS, SYSTEMS, AND INSTRUCTIONS TO DETERMINE WHETHER TO LOAD ENCRYPTED COPIES OF PROTECTED CONTAINER PAGES INTO PROTECTED CONTAINER MEMORY

CROSS REFERENCE TO RELATED APPLICATIONS

This application is a Continuation of U.S. patent application Ser. No. 15/274,217, filed Sep. 23, 2016, entitled as "PROCESSORS, METHODS, SYSTEMS, AND INSTRUCTIONS TO DETERMINE WHETHER TO LOAD ENCRYPTED COPIES OF PROTECTED CONTAINER PAGES INTO PROTECTED CONTAINER MEMORY", which is hereby incorporated herein by this reference in its entirety and for all purposes.

BACKGROUND

Technical Field

Embodiments described herein generally relate to processors. In particular, embodiments described herein generally relate to secure data handling with processors.

Background Information

Desktop computers, laptop computers, smartphones, servers, routers and other network elements, and various other types of computer systems and/or other electronic devices, are often used to process secret or confidential data. A few representative examples of such secret or confidential data include, but are not limited to, passwords, account data, financial data, commercial transaction data, confidential company data, enterprise rights management data, personal calendars, personal contacts, medical data, other personal information, and the like. It is often useful and beneficial to be able to securely handle such secret or confidential data within the electronic devices in order to protect it from inspection, tampering, and the like.

BRIEF DESCRIPTION OF THE DRAWINGS

The invention may best be understood by referring to the following description and accompanying drawings that are used to illustrate embodiments. In the drawings:

FIG. 8A is a block diagram illustrating an embodiment of an in-order pipeline and an embodiment of a register renaming out-of-order issue/execution pipeline.

FIG. 8B is a block diagram of an embodiment of processor core including a front end unit coupled to an execution engine unit and both coupled to a memory unit.

DETAILED DESCRIPTION OF EMBODIMENTS

Disclosed herein are embodiments of processors, methods, systems, instructions, and machine-readable mediums to store pages between regular memory and protected container memory. In the following description, numerous specific details are set forth (e.g., specific types of protected container architectures, types of protected container control structures, ways of protecting data, sequences of operations, instruction operations, processor configurations, microarchitectural details, etc.). However, embodiments may be practiced without these specific details. In other instances, well-known circuits, structures and techniques have not been shown in detail to avoid obscuring the understanding of the description.

Figure 1:
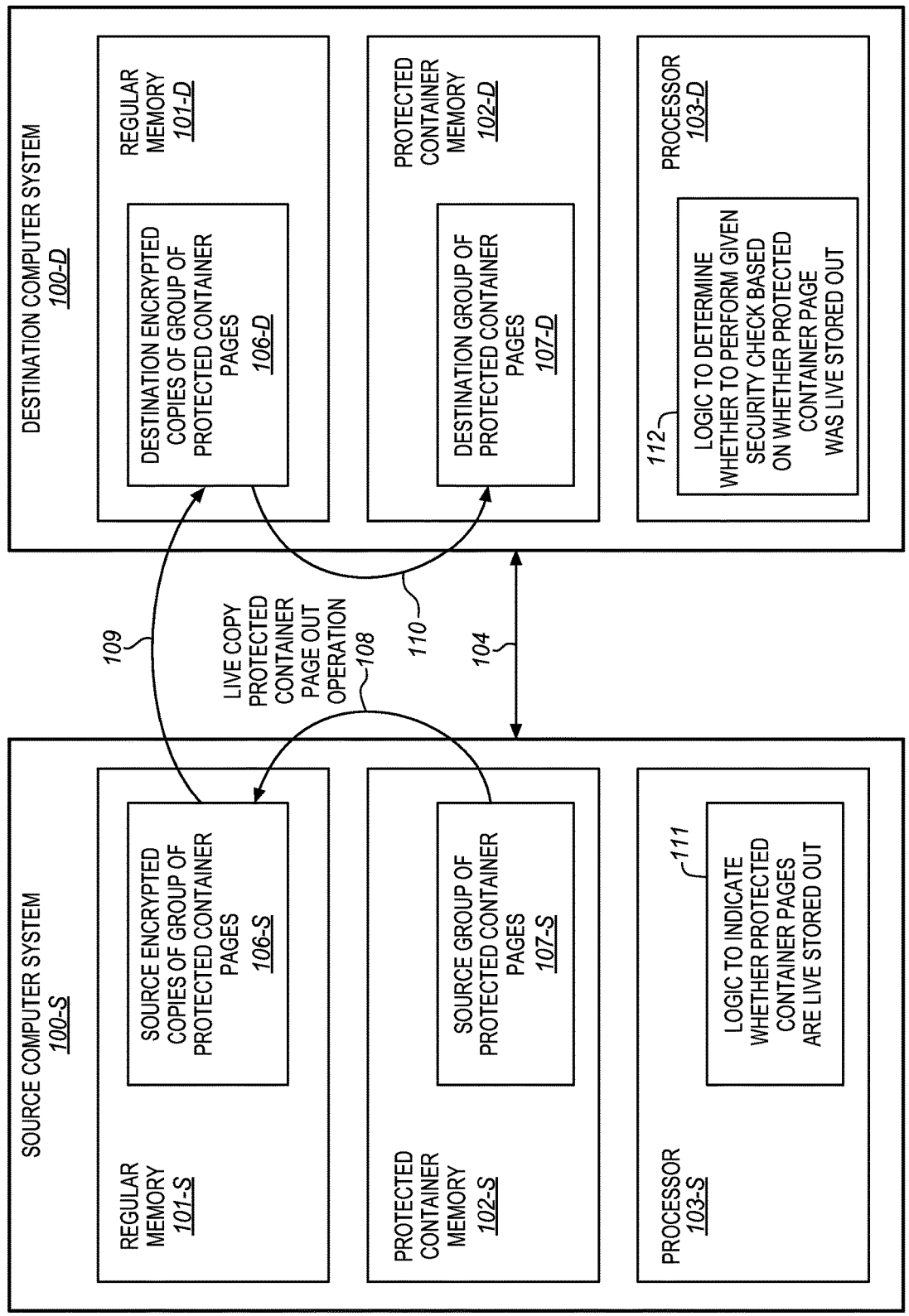
FIG. 1 is a block diagram illustrating migration of a group of protected container pages from a source computer system to a destination computer system.

FIG. 1 is a block diagram illustrating migrating or otherwise moving a source group of protected container pages 107-S from a source computer system 100-S to a destination computer system 100-D. The source and destination computer systems may represent desktop computers, laptop computers, servers, network elements, or other types of computer systems. The source and destination computer systems may be connected or otherwise coupled by one or more cables, wired and/or wireless networks, or other links 104.

The source and destination computer systems 100-S, 100-D may each be operative to support protected containers. The source computer system has a regular memory 101-S, a protected container memory 102-S, and at least one processor 103-S. Likewise, the destination computer system has a regular memory 101-D, a protected container memory 102-D, and at least one processor 103-D. The protected container memories may have a higher level of protection and/or security then the regular memories. As used herein, the "regular" memories refer broadly to memories that are not protected container memories, and that have a lower level of protection and/or security than protected container memories. By way of example, the regular memories may have a level of protection and/or security that is similar to that conventionally used in desktop or server computer systems to store user-level applications (e.g., database applications, network management applications, word processing applications). By comparison, the protected container memories may have at least some additional protection and/or security, beyond that of the regular memories, in order to provide additional security and/or protection to data stored therein. Various different levels of additional security and/or protection are suitable. As one specific example, the protected container memories may optionally have a level of security and/or protection similar to, or the same as, an Intel® Software Guard Extensions (Intel® SGX) enclave page cache (EPC), although the scope of the invention is not so limited. Alternatively, more or less security may optionally be used.

The protected container memory 102-S of the source computer system has a source group of protected container pages 107-S. As used herein, "group" means at least two and optionally more. In one aspect, the source group of protected container pages may include all pages of a given protected container. In various embodiments, the protected container pages may represent pages of a secure enclave, an isolated execution environment, an isolated execution region, a container that is operative to maintain code and/or data thereof secret from more privileged or even the highest privileged system level software, or other types of protected containers. As one specific example, the protected container pages may be pages of an Intel® SGX secure enclave, although the scope of the invention is not so limited.

In some embodiments, the source group of protected container pages 107-S may be migrated, moved, or otherwise stored from the protected container memory 102-S of the source computer system to the protected container memory 102-D of the destination computer system, as a destination group of protected container pages 107-D. For example, in some embodiments, this may be performed in conjunction with migrating a virtual machine, an operating system (OS) container, or other domain that is using the source group of protected container pages from the source to the destination computer system, although the scope of the invention is not so limited.

Initially the source group of protected container pages 107-S may be encrypted and copied or stored out of the protected container memory 102-S to the regular memory 101-S as source encrypted copies 106-S of the group of protected container pages. In some embodiments, this may be done through one or more "live" copy or "live" store operations 108. The term "live" refers to the aspect that at least some of the group of protected container pages are stored out of the protected container memory into regular memory, while at least some of the group of protected container pages (e.g., potentially including the pages that were copied) remain useable or "live" (e.g., valid and accessible) within the protected container memory. In the case of a live migration of a protected container, such a live copy or otherwise live store operation may allow a VM, OS container, or other domain, which is using the protected container, to be able to continue to use the protected container, even after the migration has started, and while the live migration is being performed. For example, in some embodiments, the "live" copy or "live" store operations 108 may optionally be performed as described below for FIG. 4 and/or FIG. 5.

The source encrypted copies 106-S may then be stored 109 to the regular memory 101-D of the destination computer system as destination encrypted copies 106-D of the group of protected container pages. In some embodiments, they may optionally be live stored, while at least one of the corresponding source group of protected container pages 107-S remains live and useable in protected container memory 102-S. Alternatively, they may optionally be stored after use of the source group of protected container pages 107-S has stopped. Finally, the destination encrypted copies 106-D may be loaded or otherwise stored 110 from the regular memory 101-D to the protected container memory 102-D as the destination group of protected container pages 107-D. For example, in some embodiments, this may optionally be performed as described below for FIG. 6 and/or FIG. 7.

Now, in some embodiments, it may be an underlying policy associated with the protected container pages that at most one copy of a protected container page at a time is allowed to be stored in, and valid in, protected container memory. For example, this may enhance protection by helping to prevent cloning and/or replay. In some embodiments, every time a protected container page is stored out of the protected container memory, it may be associated with (e.g., tagged with and encrypted with in order to bind them) a unique version, and the unique version may be stored or preserved for later use. In the case of protected container pages paged out of the protected container memory through regular paging (but not in the case of protected container pages live stored out of the protected container memory), the protected container pages in the protected container memory may be made not useable (e.g., invalidated and/or made inaccessible). Later, in order to load the protected container page back into the protected container memory, the unique version associated with (e.g., tagged with and encrypted with) the protected container page may need to match the preserved unique version. If the versions match, the protected container page may be loaded into the protected container memory, and the stored or preserved unique version may be cleared or otherwise invalidated. Forcing the two versions to match may help to ensure that only the most recent version of the page is loaded. Invalidating the stored or preserved unique version may help to ensure that the page is loaded at most once into the protected container memory. This is just one illustrative example. Other ways of using versions to help provide protection against cloning and/or replay are also possible.

However, in the case of a protected container page being live stored out of the protected container memory, the protected container page may remain useable and live (e.g., may not be invalidated and/or not made inaccessible) in the protected container memory. Accordingly, in some embodiments, one or more additional protections may be useful and beneficial in order to help ensure that at most one copy of a protected container page at a time is allowed to be stored in, and valid in, protected container memory. In some embodiments, the processor 103-S (more generically a processor) may optionally include logic 111 to indicate whether an encrypted copy of a protected container page was live copied or otherwise live stored out of protected container memory, although this is not required.

In some embodiments, the processor 103-D (more generically a processor) may include logic 112 to determine whether to perform an additional security check to determine whether to load or otherwise store an encrypted copy of a protected container page (e.g., one of the destination encrypted copies 106-D) from regular memory (e.g., the regular memory 101-D) to protected container memory (e.g., the protected container memory 102-D) based, at least in part, on whether the encrypted copy of the protected container page was live copied or otherwise live stored out of protected container memory. In some embodiments, the logic 112 may also be operative to perform the additional security check which may involve determining whether the copying or storing of a corresponding entire group of protected container pages (e.g., the source group of protected container pages 107-S) out of the protected container memory (e.g., the protected container memory 102-S) has completed. The corresponding group represents the group that includes the page for which the load determination is being made.

Figure 2:
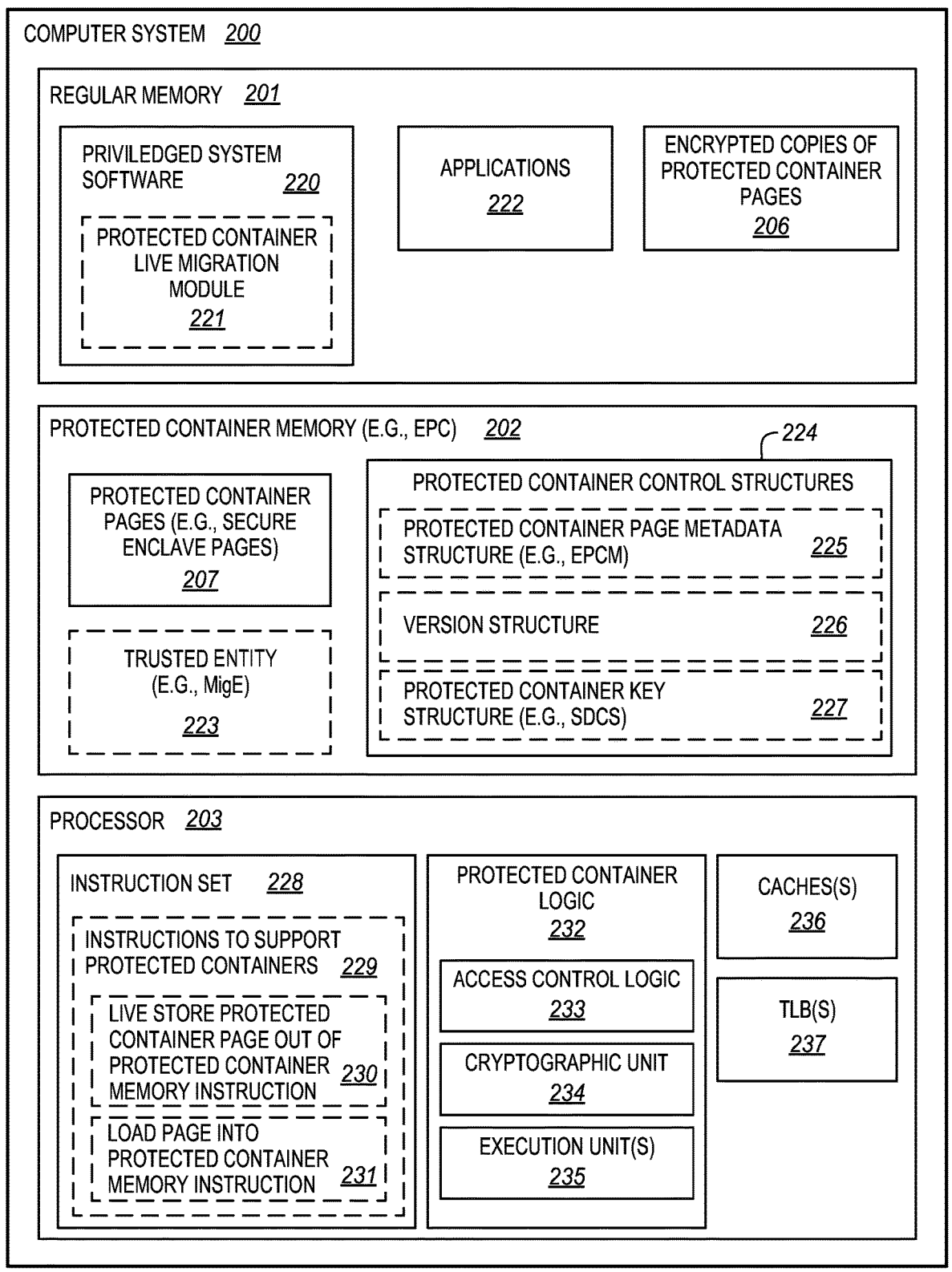
FIG. 2 is a block diagram of a detailed example embodiment of a computer system in which embodiments may be implemented.

FIG. 2 is a block diagram of a detailed example embodiment of a computer system 200 in which embodiments may be implemented. The computer system includes a regular memory 201 and a protected container memory 202. The regular and protected container memories may optionally be similar to or the same as those previously described. The regular and protected container memories may represent different portions of main or system memory, which may include one or more devices of one or more types (e.g., dynamic random access memory (DRAM), flash memory, hard disks, tapes, and combinations thereof). Also, one or more portions of one or more caches of the processor, or one or more dedicated caches of the processor, may represent on-die protected container memory. The regular memory may be used to store privileged system software 220 (e.g., an operating system (OS), a hypervisor or virtual machine monitor (VMM), etc.), and one or more user-level applications 222 (e.g., network applications, database applications, word processing applications).

During use, protected container pages 207 (e.g., pages of at least one protected container) may be stored in the protected container memory 202. In various embodiments, the protected container may represent a secure enclave, an isolated execution environment, an isolated execution region, a container operative to maintain code and/or data thereof secret even from more privileged system level software, or other types of protected containers. One specific suitable example of the protected container pages is Intel® SGX secure enclave pages, although the scope of the invention is not so limited. One specific suitable example of the protected container memory is an Intel® SGX enclave page cache (EPC), although the scope of the invention is not so limited.

An application, virtual machine (VM), OS container, or other entity may store data and/or code in the protected container pages 207. As used herein, the code and/or data may be referred to as "data" or "contents" of the protected container pages. A protected container architecture (e.g., protected container control structures 224, instructions 229 to support protected containers, protected container logic 232) may help to keep the contents of the protected container pages confidential. This may include preventing disclosure of these contents to other entities. In some embodiments, these contents may be kept confidential from more highly or even the most highly privileged system level software (e.g., an OS and/or a VMM). In some implementations, the privileged system level software may help to create and/or manage the protected container, but the protected container may be generally opaque and inaccessible (e.g., not readable and not writeable) to the privileged system software.

The processor may have protected container logic 232 including access control logic 233. In some embodiments, the access control logic may be operative to control access to the protected container memory 202, as well as contents of the protected container memory when such contents are resident in an unencrypted form in one or more caches 236, registers, or other on-die structures or storage of the processor. These on-die structures or storage may represent on-die protected container memory. In some embodiments, the access control logic may be operative to allow accesses to a protected container page or its contents from code of the same protected container, but prevent accesses from code outside of the protected container (e.g., even highly or the most highly privileged system level software). By way of example, in some embodiments, the access control logic may include one or more range registers to store one or more ranges for the protected container memory, and a memory management unit (MMU) and/or a page miss handler (PMH) unit to control access to the protected container memory in part by consulting with the range registers, page tables, protected container control structures 224, and the like. One specific suitable example of the access control logic is that found on Intel® SGX enabled processors, although the scope of the invention is not so limited.

An on-die cryptographic unit 234 may be operative to automatically encrypt protected container pages 207 before they are stored out of the protected container memory into the regular memory (e.g., as one of the encrypted copies 206 of the protected container pages). Such encryption may help to keep the data confidential when it is resident outside of the protected container memory. Likewise, the cryptographic unit may be operative to automatically decrypt the encrypted copies of the protected container pages when they are to be loaded or stored from the regular memory into the protected container memory in an unencrypted format. In some embodiments, the encryption or decryption may be performed in response to a single instruction (e.g., the live store protected container page out of protected container memory instruction 230 and/or the load page into protected container memory instruction 231), as opposed to the encryption or decryption being performed by a software sequence of machine instructions.

In some embodiments, the cryptographic unit 234 may also optionally be operative to provide cryptographic integrity protection and/or authentication to protected container pages when they are exchanged between the protected container memory and the regular memory. For example, the cryptographic unit may automatically compute a message authentication code (MAC), or other authentication or integrity check data, for the protected container pages before they are stored out of the protected container memory. The cryptographic unit may also optionally be operative to use such authentication or integrity check data to authenticate or ensure the integrity of the protected container pages when they are stored back into the protected container memory. Such authentication or integrity checking may help to detect integrity violations or tampering of the protected container pages and prevent access to such changed or tampered data.

In some embodiments, an instruction set 228 of the processor may optionally include one or more instructions 229 to help support protected containers. In some embodiments, these instructions may optionally include a live store protected container page out of protected container memory instruction 230. In some embodiments, this instruction 230 may optionally be similar to or the same as the instruction shown and described further below for FIG. 5. In some embodiments, these instructions may optionally include a load page into protected container memory instruction 231. In some embodiments, this instruction 231 may optionally be similar to or the same as the instruction shown and described further below for FIG. 7. Without limitation, the instruction set may optionally include additional instructions to create a protected container, destroy a protected container, enter a protected container, exit a protected container, manage paging for a protected container, measure a protected container, or the like, or various combinations thereof. The processor may have one or more execution units 235 to perform the instructions 229. Rather than individual discrete units, as may often be used for simple arithmetic instructions, such execution units may commonly include dispersed or distributed logic, which collectively represents the execution units that perform these instructions.

In some embodiments, one or more protected container control structures 224 may be used to help control various aspects associated with the protected container architecture. As shown, in some embodiments, these protected container control structures may optionally be stored in the protected container memory 202. Alternatively, one or more protected container control structures may optionally be located in on-die access restricted structures or storage of the processor. The number and types of such protected container control structures may vary widely from one implementation to another (e.g., depending upon whether fewer or more control structures are desired, what types and levels of protection are implemented, the particular way in which data is distributed among the control structures, etc.). The scope of the invention is not limited to any known number of protected container control structures and/or types of protected container control structures. Nevertheless, in order to further illustrate certain concepts, one suitable set of control structures will be further described, although it is to be appreciated that this is merely illustrative.

In some embodiments, a version structure 226 may be used to store the most recent versions of protected container pages when they are stored out of the protected container memory. In some embodiments, the same version structure may optionally be used to store both versions of protected container pages that are paged out of the protected container memory through regular paging, as well as versions of protected container pages that are live stored out of the protected container memory, although the scope of the invention is not so limited. There is no requirement that a new separate control structure be used specifically for live stored out pages. The use of a single structure may tend to help simplify version management by unifying the version information in the same single structure, and avoiding the need to manage one version structure for paged out pages, and another version structure for live stored out pages. This may also tend to help simplify the instruction set architecture of the processor. One specific suitable example of a suitable version structure that may be used for both paged out and live stored out pages, for some embodiments, is an Intel® SGX version array (VA), although the scope of the invention is not so limited. Other embodiments are possible that do not require the use of such versions.

In some embodiments, a protected container key structure 227 may optionally be used to store one or more cryptographic keys for protected containers. In some embodiments, as will be explained further below, an indication of whether or not a live protected container page group copy operation has committed or otherwise completed may optionally be stored in the protected container key structure, although the scope of the invention is not so limited. Alternatively, such an indication may optionally be stored in another type of protected container control structure (e.g., the PCPMS, the version structure, etc.), in an access restricted on-die storage or structure of the processor, or in another secure location. One specific suitable example of the protected container key structure, for some embodiments, is an Intel® SGX domain control structure (SDCS), although the scope of the invention is not so limited.

In some embodiments, a protected container page metadata structure (PCPMS) 225 may be used to store certain types of metadata for the protected container pages 207. One specific suitable example of the PCPMS, for some embodiments, is an Intel® SGX enclave page cache map (EPCM), although the scope of the invention is not so limited. The PCPMS may optionally store any of the various types of data conventionally stored in the EPCM, or a subset thereof, as well as different data.

Referring again to FIG. 2, in some embodiments, the privileged system software 220 may optionally include a protected container live migration module 221. By way of example, the protected container live migration module may be part of a virtual machine monitor (VMM) or an operating system. In some embodiments, the computer system may include a trusted entity 223 (e.g., an architectural or controlling secure enclave). As shown, the trusted entity may also optionally be stored in the protected container memory. The trusted entity may be more trusted than and/or may have more privileges than (at least with regard to protected containers) other protected containers and in some cases also the privileged system software. One specific suitable example of the trusted entity is an Intel® Software Guard Extensions (Intel® SGX) migration engine (MigE), although the scope of the invention is not so limited. In some embodiments, the protected container live migration module 221, and the trusted entity 223, may cooperate or work together to perform live migration of protected containers.

It is to be appreciated that this is just one illustrative example embodiment of a suitable protected container environment in which embodiments may be implemented. The level of protection, and the types of protection, may vary from one implementation to another depending upon the need for security, cost versus security tradeoffs, etc. Embodiments disclosed herein may be used in various protected container architectures with varying levels and types of protection and with different corresponding protected container architecture designs.

Figure 3:
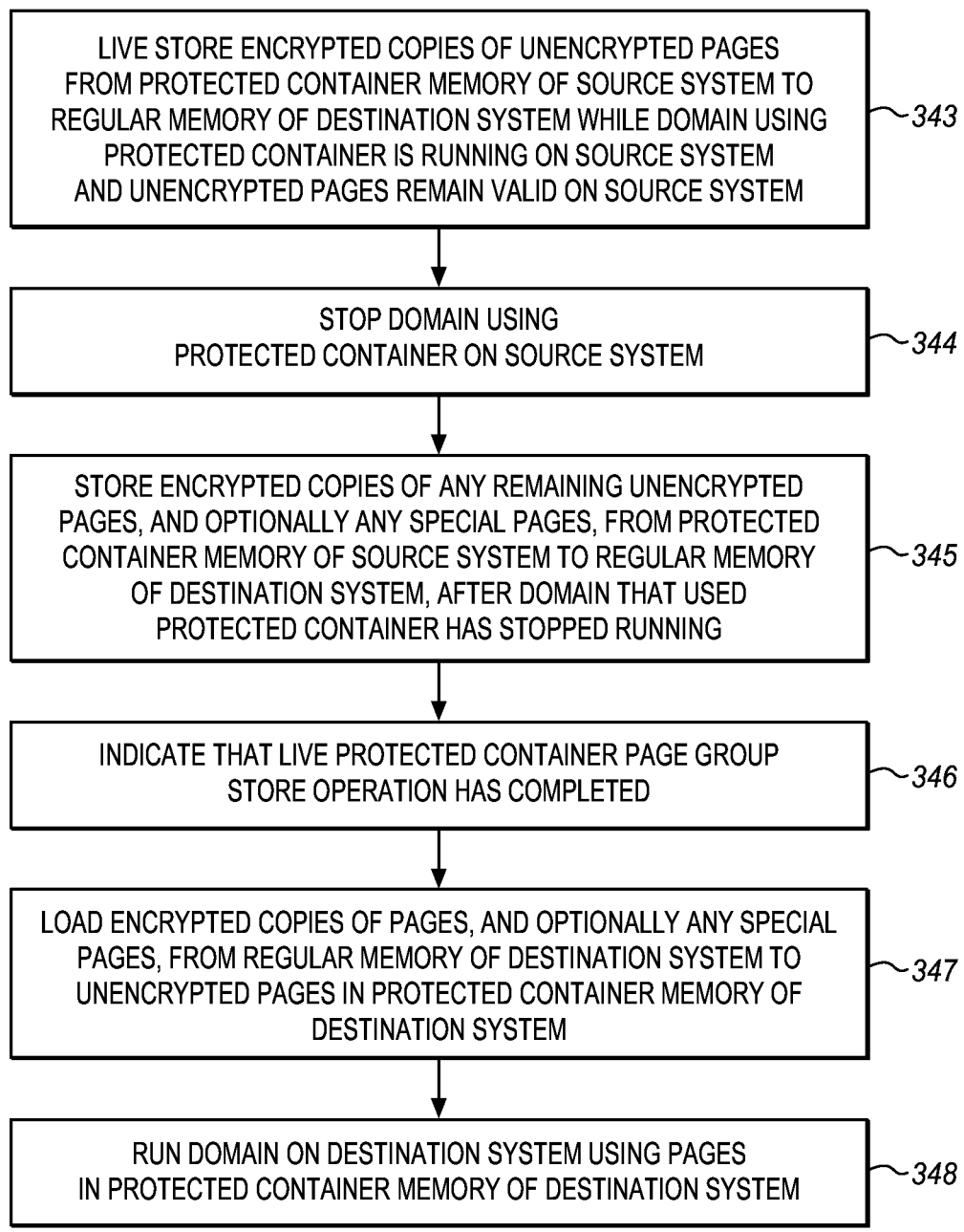
FIG. 3 is a block flow diagram of an example embodiment of a method of live migration of a protected container from a source computer system to a destination computer system.

FIG. 3 is a block flow diagram of an example embodiment of a method 342 of live migration of a protected container from a source computer system to a destination computer system. In some embodiments, this method may be performed in conjunction with live migration of a VM, OS container, or other domain that is using the protected container, although the scope of the invention is not so limited. In some embodiments, the method may be controlled or managed by a protected container live migration module (e.g., the protected container live migration module 221) and a trusted entity (e.g., an architectural secure enclave, the trusted entity 223) working together.

At block 343, encrypted copies of unencrypted protected container pages in a protected container memory of the source computer system may be live copied or otherwise live stored to a regular memory of the destination computer system, while the domain that is using the protected container pages is running on the source computer system, and while the protected container pages remain useable and live (e.g., valid and accessible) in the protected container memory of the source computer system. In some embodiments, each protected container page may optionally be live copied or otherwise live stored out of the protected container memory by using the approach of FIG. 4 and/or FIG. 5, or any of the variations mentioned therefor, although the scope of the invention is not so limited. In some embodiments, for each page live copied or otherwise live stored out of the protected container memory, an indication may be stored, or otherwise given or provided, that the page was live copied or otherwise live stored out of the protected container memory. By way of example, in some embodiments, this may be done similar to or the same as shown at block 455 of FIG. 4, although the scope of the invention is not so limited.

Often, in order to help reduce the amount of downtime needed to achieve the full migration of the protected container, it may be beneficial to live store a good proportion, or as many pages as possible, while the domain is live and running on the source computer system. For example, all of the protected container pages may be iterated through one or more times, and live copied from the protected container memory. The iteration is useful since pages that were live copied may be written to by the source computer system and may need to be live copied again. Typically, after a few iterations, the set of remaining uncopied protected container pages may approximately converge to the write working set of protected container pages, which have been written to during the migration window or timeframe. The written to protected container pages may be outdated, and so the encrypted copies stored outside of the protected container memory may be invalidated, and then the protected container pages may be copied again.

At block 344, the virtual machine, OS container, application, or other domain that is using the protected container on the source computer system may be stopped. At this point, the pages of the protected container may no longer be in live or in use.

At block 345, any remaining uncopied protected container pages (e.g., often primarily the write working set of pages), and optionally any control structures or other special pages, may be encrypted and stored from the protected container memory of the source computer system, to the regular memory of the destination computer system. This may generally be done after the domain that was using the protected container has stopped running.

At block 346, an indication may be stored, or otherwise provided or given, that the live protected container page group copy operation has committed or otherwise completed. As one specific example, this may be done when all pages of a protected container have been stored from the protected container memory of the source computer system to regular memory of the destination computer system, during a migration of the protected container from the source computer system to the destination computer system, although the scope of the invention is not so limited. Alternatively, this may be done when all pages of the protected container have been stored from the protected container memory of the source computer system to the regular memory of the source computer system.

This indication may be provided in different ways in different embodiments. In some embodiments, a trusted entity (e.g., the trusted entity 223) or a VMM may increment or update an epoch or other counter, or otherwise change, update, or store a value, to indicate that the live protected container page group copy operation has completed. In some embodiments, the indication may optionally be stored or provided in a protected container control structure. As one specific example, the indication may optionally be stored in the protected container key structure 227 (e.g., an SDCS). Alternatively, the indication may optionally be stored elsewhere, such as, for example, in on-die access restricted logic of the processor.

At block 347, encrypted copies of protected container pages, and optionally any control structures or other special pages, may be loaded or otherwise stored from the regular memory of the destination computer system into the protected container memory of the destination computer system. In some embodiments, when attempting to load or store each encrypted page, a determination may be made whether the encrypted page had been live copied or otherwise live stored out of the protected container memory. For example, this may include checking for the indication provided at block 343. In some embodiments, if the determination is that the page had been live stored out of the protected container memory, then an additional check or determination may be made before determining to load the page into the protected container memory. For example, in some embodiments, the check or determination may be whether a corresponding live page group copy or store operation (e.g., a protected container live migration), which was used to live store the encrypted page out of the protected container memory, has committed or otherwise completed. In some embodiments, this check or determination may involve using the indication provided at block 346. In some embodiments, if the live page group store operation has not completed, it may be determined not to load the page into the protected container memory. Conversely, if the live page group store operation has completed, it may be determined to load the page into the protected container memory. In some embodiments, each encrypted page may optionally be loaded or otherwise stored by using the approach of FIG. 6 and/or FIG. 7, or any of the variations mentioned therefor, although the scope of the invention is not so limited.

At block 348, the domain may be run on the destination computer system using the protected container pages in the protected container memory of the destination computer system. It is to be appreciated that this is just one example illustrative embodiment of a suitable method for migration of a protected container from a source computer system to a destination computer system. Other methods are also contemplated, and will be apparent to those skilled in the art, and having the benefit of the present disclosure.

Figure 4:
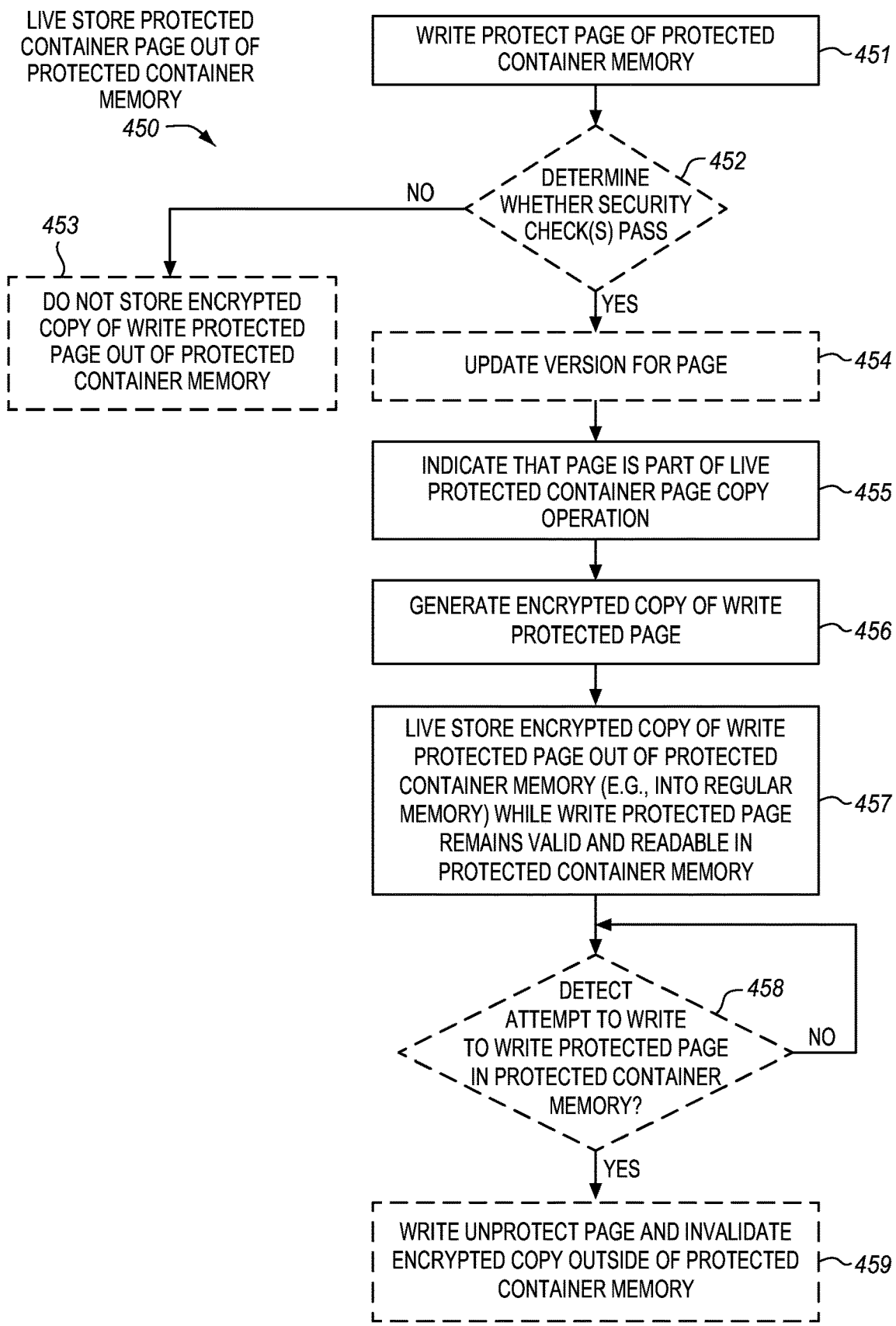
FIG. 4 is a block flow diagram of an example embodiment of a method of live copying or otherwise live storing a protected container page out of a protected container memory.

FIG. 4 is a block flow diagram of an example embodiment of a method 450 of live copying or otherwise live storing a protected container page out of a protected container memory. In various embodiments, the method may be performed by a processor, instruction processing apparatus, digital logic device, or integrated circuit. In some embodiments, the method may be performed by and/or with the processor 103-S of FIG. 1 and/or the processor 203 FIG. 2 and/or the processor 503 FIG. 5. The components, features, and specific optional details described herein for the processor 103-S and/or the processor 203 and/or the processor 503, also optionally apply to the method. Alternatively, the method may be performed by and/or within a similar or different processor or apparatus. Moreover, the processor 103-S and/or the processor 203 and/or the processor 503 may perform methods the same as, similar to, or different than the method 450.

At block 451, the protected container page of the protected container memory may be write protected. In some embodiments, the page may be write protected by configuring a write protection indication (e.g., one or more bits), for example in a protected container control structure (e.g., the PCPMS 225), to indicate that the page is write protected. For example, in an embodiment of an Intel® SGX implementation, enclave pages may be write protected by configuring (e.g., setting) a write protect (WP) bit in an enclave page cache map (EPCM), although the scope of the invention is not so limited. In some embodiments, while write protected, the pages may remain useable and live (e.g., valid and accessible) in the protected container memory. In some embodiments, each write protected page may also be write protected (e.g., made read and execute only) in paging tables or structures (e.g., extended page tables), although the scope of the invention is not so limited.

At block 452, a determination may optionally be made whether any optionally implemented security checks pass. The number and type of such optional security checks may vary from one implementation to another, depending in part on factors such as the desired level of security, and the particular way in which the protected container architecture is implemented. Nevertheless, in order to further illustrate certain concepts, a few possible types of security checks will be further described, although it is to be appreciated that these are merely illustrative. One optional security check may include checking to ensure that the protected container page is write protected. Another optional security check may include checking to ensure that protected container control structures that are to be used in the operation are compatible or otherwise appropriate for the operation.

A further optional security check may include checking to ensure that there are no writeable references to the write protected page. For example, this may be useful if at least one TLB is used to cache a virtual to physical address translation for the protected container page. In some cases, read and write access permissions for the protected container page may also be cached in the TLB. However, the access permissions may be those at the time the translation was performed (e.g., when a page table walk was performed), and the determined translation and access permissions were stored in the TLB. If a memory access request is performed after the protected container page has been write protected, outdated access permissions (e.g., which do not reflect that the protected container page is write protected) may be found cached in the TLB. Accordingly, it may optionally be useful to check whether there are any outdated writable references to the protected container page cached in the TBL, and if so to either update them or flush them. Alternatively, another options would be to always update the access permissions in the TLB when the page is write protected. Yet another possible option would be to always flush the TLBs of all protected container pages to be migrated right before they are write protected.

If one or more of the optionally implemented security check(s) do not succeed, the method may advance to block 453. At block 453, the encrypted copy of the write protected page may not be stored out of the protected container memory. For example, a fault, exceptional, or other exceptional condition may optionally be signaled in order to allow a privileged entity (e.g., an OS and/or a VMM) to investigate. Alternatively, if the optionally implemented security checks succeed, the method may advance to block 454.

At block 454, a version for the protected container page may optionally be updated. For example, this may be done in some embodiments where the version may be used to help ensure that at most one copy of a protected container page at a time is allowed to be stored in, and valid in, protected container memory (e.g., to prevent cloning and/or replay). By way of example, according to one possible approach, every time a protected container page is to be stored out of the protected container memory (e.g., paged out through regular paging or live stored out), it may be associated with (e.g., tagged with and encrypted with in order to bind them) a unique version, and the unique version may be stored or preserved for later use. By way of example, the unique version may represent an epoch or other counter that may be incremented or decremented or otherwise changed, or another value that may be otherwise updated or changed, each time the page is to be copied or stored out of the protected container memory into regular memory. This version may later be used when determining whether to load pages back into the protected container memory. For example, the unique version associated with (e.g., tagged with and encrypted with) the protected container page may need to match the preserved unique version. If the versions match, the page may be loaded into the protected container memory, and the stored or preserved unique version may be cleared or otherwise invalidated. Forcing the two versions to match may help to ensure that only the most recent version of the protected container page is within the protected container memory. Invalidating the stored or preserved unique version may help to ensure that the page is loaded at most once into the protected container memory.

In some embodiments, the same version structure may optionally be used to store both versions of protected container pages that are paged out of the protected container memory through regular paging, as well as versions of protected container pages that are live stored out of the protected container memory. In other words, there may be no requirement that a new separate control structure be used specifically live copied out pages. This may tend to help simplify version management by unifying the version information in the same single structure and avoiding the need to manage one version structure for paged out pages and another version structure for live stored out pages. This may also tend to help simplify the instruction set architecture of the processor. One specific suitable example of a suitable version structure that may be used for both paged out and live stored out pages, for some embodiments, is an Intel® SGX version array (VA), although the scope of the invention is not so limited. Other embodiments are possible that do not require the use of such versions.

At block 455, an indication may be stored or otherwise given or provided that the page was live copied or otherwise live stored out of the protected container memory. For example, in some embodiments, the indication may represent one or more bits and/or a value associated with the page may be given a first value to indicate that the associated page was part of such a live protected container page copy or store operation, instead of one or more other values that do not. As one specific example, according to one possible convention, a particular single bit in a particular control structure, register, or other location, may be set to binary one to indicate that its associated page was part of the live copy or store operation, or cleared to binary zero to indicate that its associated page was not.

The indication may be stored or otherwise preserved in different structures or locations in different embodiments. As one example, the indication may be in a header, control structure, or other data structure that may be kept with the protected container page stored out of the protected container memory (e.g., encrypted along with copy of the protected container page). Encrypting the indication along with the encrypted copy of the protected container page may help to bind them together as well as secure or protect the indication from tampering, inspection, and the like. As another example, the indication may be stored in a protected container control structure in a protected container memory and be associated with the protected container page (e.g., stored in an entry or other portion of the protected container control structure corresponding to the page). Possible examples of suitable protected container control structures include, but are not limited to, the PCPMS 225, an Intel® SGX EPCM, an exported and cryptographically protected version of a PCPMS entry, an Intel® SGX PCMD, the version structure 226, and an Intel® SGX version array (VA) for example in a corresponding VA slot. It is also possible to move such an indication from a per-page control structure to a global control structure (e.g., an Intel® SGX SDCS). As yet another example, the indication may be stored or preserved in an access restricted on-die logic of a processor (e.g., in an access restricted on-die register, table, firmware, storage area, or the like). In one specific possible Intel® SGX embodiments, the indication may optionally be stored in the Intel® SGX EPCM entry and the Intel® SGX PCMD, although the scope of the invention is not so limited.

At block 456, an encrypted copy of the write protected page of the protected container memory may be generated. In some embodiments, a cryptographic unit of the processor (e.g., the cryptographic unit 234) may be used to generate the encrypted copy. In some embodiments, the encryption may be performed by, or at least predominantly by, on-die hardware and/or firmware logic of the processor, instead of predominantly by a software sequence of machine instructions or higher level instructions.

At block 457, the encrypted copy of the write protected page of the protected container memory may be live copied or otherwise live stored out of the protected container memory to regular memory (e.g., to the regular memory of the same computer system), while the write protected page remains useable and live (e.g., valid and accessible) in the protected container memory. In some embodiments, even after the encrypted copy has been stored out of the protected container memory, a VM, OS container, or other domain using the corresponding protected container, may be allowed to access the write protected page in the protected container memory.

At block 458, a determination may be made whether an attempt to write to the write protected page of the protected container memory has been detected. If no such attempted write has been detected (i.e., "no" is the determination), then the method may revisiting block 458, and continue to monitor for such writes. Alternatively, if such an attempt to write to the write protected page in the protected container memory has been detected (i.e., "yes" is the determination at block 458), then the method may advance to block 459. By way of example, such an attempt may be detected by logic of the processor (e.g., responsive to an extended page table violation), and responsive thereto the processor may signal a fault or other exceptional condition.

At block 459, the write protected page may be write unprotected, and any encrypted copies of the page previously stored outside of the protected container memory (e.g., in regular memory) may be invalidated. Invalidating the copies previously outside of the protected container memory may help to ensure that the contents of the encrypted copy and the page in the protected container memory do not become different. In some embodiments, the page may be write unprotected by configuring a write protection indication (e.g., one or more bits), for example in a protected container control structure (e.g., the PCPMS 225), to indicate that the page is not write protected. For example, in an embodiment of an Intel® SGX implementation, an enclave page may be write unprotected by configuring (e.g., clearing) the write protect (WP) bit in the enclave page cache map (EPCM), although the scope of the invention is not so limited. By way of example, in an Intel® SGX implementation, the version used to in the live copy operation may be stored in the EPCM and the VA page. In order to clear the write protect bit, in Intel® SGX both the version in the EPCM and the VA page will be cleared. This invalidates the live copy, since to load the live copied page, the version that was generated during the live copy operation is needed. The clearing of the write protect indicator also clears the version helps to guarantee the live copied page cannot be copied.

One illustrate example of a suitable method is shown in FIG. 4, although many modifications to the method are contemplated. Operations may optionally be added to and/or removed from the method. For example, an alternate method may include only blocks 455, 456, and 457. As another example, another alternate method may include only blocks 455 and 457. As yet another example, yet another alternate method may include only blocks 454 and 455. In addition, alternate embodiments may optionally perform certain of the operations in different order, combine certain operations, overlap certain operations, etc. For example, block 455 may optionally be performed either before block 454 or after block 457.

In some embodiments, one or more of the blocks of the method may optionally be performed in response to a single instruction. As one example, blocks 452, 454, 455, 456, and 457, may be performed in response to such a single instruction or control primitive. As another example, blocks 455, 456, and 457 may be performed in response to such a single instruction or control primitive. As yet another example, block 455, either alone or optionally in combination with one or more of blocks 454, 456, and 457, and optionally other operations or blocks, may be performed in response to such a single instruction or control primitive. As used herein, the term "instruction" may broadly represent control primitive. Examples of such instructions or control primitives include, but are not limited to, a machine language instruction, an instruction of an instruction set of a processor, a value stored in a control register of a processor, a control signal asserted on an interface of a processor, and a request asserted on an interface of a processor for processing to be performed. The processor may either be a general-purpose processor or a special-purpose processor (e.g., a security coprocessor, a hardware security module, etc.). Additional adjectives will be used when appropriate to refer to specific types of instructions (e.g., machine language instructions).

Figure 5:
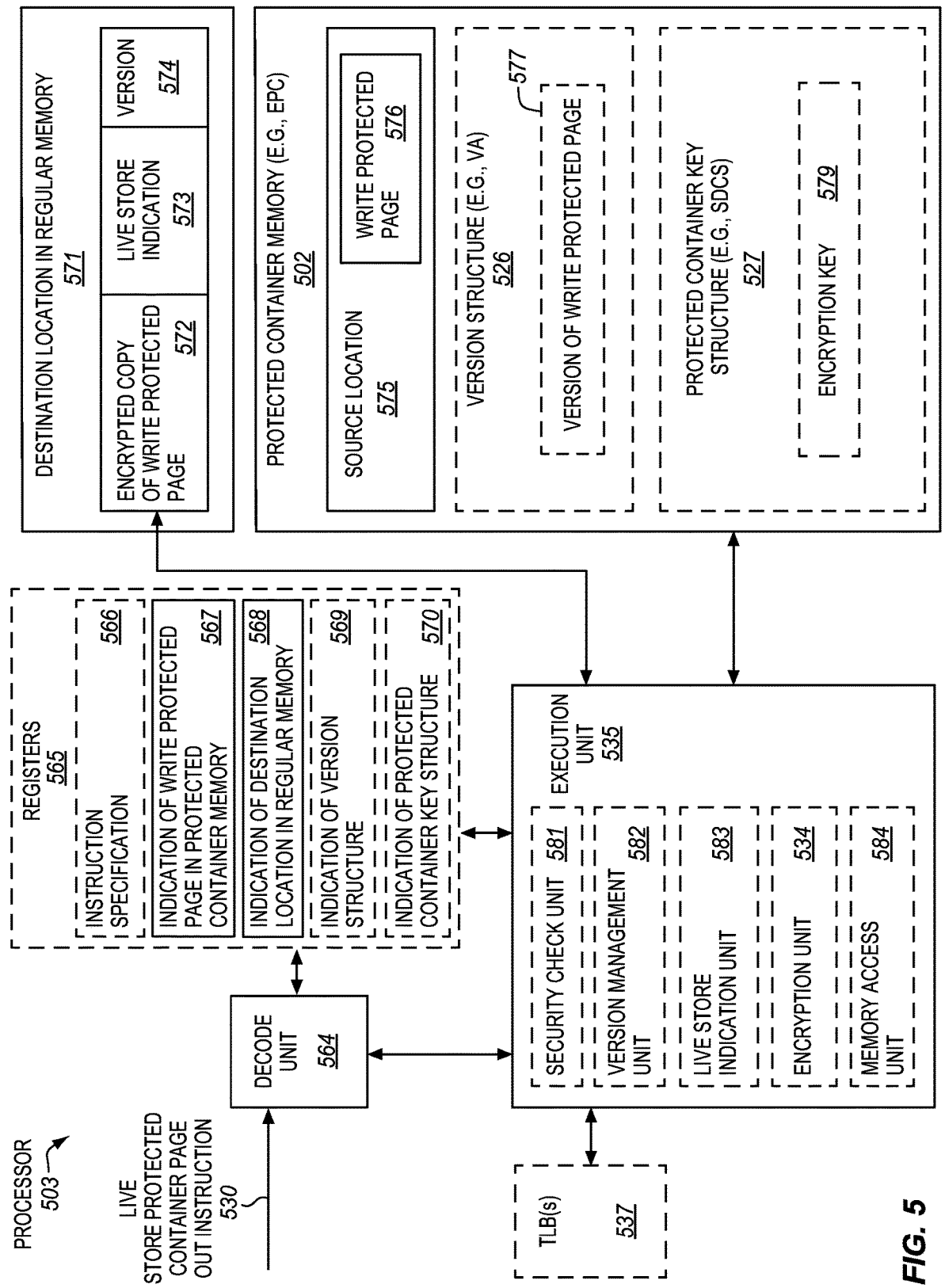
FIG. 5 is a block diagram of an embodiment of a processor that is operative to perform an embodiment of a live store protected container page out of protected container memory instruction.

FIG. 5 is a block diagram of an embodiment of a processor 503 that is operative to perform an embodiment of a live store protected container page out of protected container memory instruction 530. In some embodiments, the processor may be a general-purpose processor (e.g., a general-purpose microprocessor or central processing unit (CPU) of the type used in desktop, laptop, server, or other computers). Alternatively, the processor may be a special-purpose processor. Examples of suitable special-purpose processors include, but are not limited to, security co-processors, network processors, communications processors, and the like. The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures). In some embodiments, the processor may include be disposed on at least one integrated circuit or semiconductor die. In some embodiments, the processor may include at least some hardware (e.g., transistors, capacitors, diodes, circuitry, non-volatile memory storing microcode, or the like).

During operation, the processor may fetch or otherwise receive the live store protected container page out of protected container memory instruction 530. For simplicity, this instruction may also be referred to herein simply as a live store page out instruction and/or a live copy page out instruction. It generally represents a type of copy or store page out instruction that is performed on a live protected container page that remains useable and live in the protected container memory. The instruction may represent a macroinstruction, machine code instruction, machine language instruction, or other instruction or control signal of an instruction set of the processor. In some embodiments, the instruction may optionally have an opcode to indicate the operation to be performed. In other embodiments, the instruction may explicitly specify (e.g., through one or more fields or a set of bits), or otherwise indicate (e.g., implicitly indicate) a register having additional instruction specification 566 (e.g., a leaf function) that in combination with the opcode indicate the operation to be performed.

In some embodiments, the live store page out instruction may explicitly specify (e.g., through one or more fields or a set of bits in its encoding), or otherwise indicate (e.g., implicitly indicate) a source memory location 575 in a protected container memory 502 where a write-protected protected container page 576 is stored, and a destination memory location 571 in regular memory where an encrypted copy 572 of the write-protected protected container page is to be live copied or live stored in response to the instruction. In some embodiments, the instruction may optionally explicitly specify or otherwise indicate a source version structure 526 (e.g., the version structure 226, a version array (VA), etc.), where a version 577 of the write-protected protected container page is to be stored in response to the instruction. Alternatively, the version may optionally be stored elsewhere (e.g., in another protected container structure or in on-die access restricted logic of the processor). In some embodiments, the instruction may optionally explicitly specify or otherwise indicate source protected container key structure 527 (e.g., the key structure 227, an SDCS, etc.) in the protected container memory, where one or more encryption keys are to be stored. Alternatively, the encryption keys may optionally be stored elsewhere.

These storage locations or structures may be indicated by the live store page out instruction 530 in different ways in different embodiments. As one example, the instruction may optionally have register specification fields in its encoding to specify registers that are used to store memory address information to indicate these storage locations or structures. As another example, it may optionally be implicit, inherent, or understood that the instruction is to use particular registers that are used to store memory address information to indicate these storage locations or structures, even though the instruction may not have any additional (non-opcode and/or non-leaf function) bits in its encoding to explicitly specify such registers. A combination of these approaches may also be used. Using one or more of these approaches, the instruction may indicate a first register of a set of registers 565 that is to store an indication 567 of the write-protected protected container page, and a second register that is to store an indication 568 of the destination location in the regular memory. In embodiments where the version 577 is optionally to be stored in the version structure 526, the instruction may also indicate a third register that is to store an indication 569 of the version structure. Likewise, in embodiments where the encryption key 579 to be used is optionally to be stored in the protected container key structure 527, the instruction may indicate a fourth register that is to store an indication 570 of the protected container key structure. Alternatively, other structures or locations may optionally be indicated if the version and the completion indicator are to be stored elsewhere. In some embodiments, the memory address information from these registers may be combined with other information (e.g., information in a segment or other memory addressing register register) to form full addresses that may be used to access the structures. These are just a few illustrative examples. These structures or storage locations may also be indicated in various other ways for various other memory addressing mechanisms.

The processor includes a decode unit or decoder 564. The decode unit may receive and decode the live store page out instruction 530. The decode unit may output one or more relatively lower-level instructions or control signals (e.g., one or more microinstructions, micro-operations, microcode entry points, decoded instructions or control signals, etc.), which reflect, represent, and/or are derived from the relatively higher-level live store page out instruction. In some embodiments, the decode unit may include one or more input structures (e.g., a port, interconnect, or interface) to receive the instruction, an instruction recognition and decode logic coupled therewith to recognize and decode the instruction, and one or more output structures (e.g., a port, interconnect, or interface) coupled therewith to output the one or more lower-level instructions or control signals. The decode unit may be implemented using various different mechanisms including, but not limited to, microcode read only memories (ROMs), look-up tables, hardware implementations, programmable logic arrays (PLAs), and other mechanisms suitable to implement decode units. In some embodiments, the decode unit may be included on a die or integrated circuit (e.g., on-die with the execution unit 535). In some embodiments, the decode unit may include at least some hardware (e.g., transistors, integrated circuitry, or on-die firmware, etc.).

The execution unit 535 is coupled with the decode unit 564 and the registers 565. The execution unit may receive the one or more decoded or otherwise converted instructions or control signals that represent and/or are derived from the live store page out instruction from the decode unit. When the processor is deployed in a system, the execution unit during operation may be operative to be coupled with the regular and protected container memories and any of the operand pages and/or protected container control structures used by the instruction. In some embodiments, the execution unit 535 may be operative in response to and/or as a result of the live store page out instruction (e.g., in response to one or more instructions or control signals decoded from the live store page out instruction and/or in response to the live store page out instruction being decoded and/or in response to the live store page out instruction being provided to the decode unit) to perform the live store page out instruction.

In some embodiments, the live store page out instruction when performed may be operative to cause the execution unit and/or the processor to perform any optionally implemented security checks. In some embodiments, the execution unit may optionally have a security check logic or other unit 581 to perform any such checks. The number and type of such optional security checks may vary from one implementation to another, depending in part on factors such as the desired level of security, and the particular way in which the protected container architecture is implemented. One optional security check is a check to ensure that the protected container page is write protected. Another optional security check is a check to ensure that protected container control structures to be used are compatible and/or appropriate. Another optional security check is a check to ensure that cached address translations in one or more TLBs 537, including their access permissions, have either been updated or flushed after write protecting the page. If one or more of the optionally implemented security checks do not succeed, a fault or other exceptional condition may be signaled and/or further performance of the instruction may stop without live storing the write-protected protected container page out.

In some embodiments, if any such optionally implemented security checks are performed successfully, the performance of the live store page out instruction may continue. In some embodiments, this may further cause the execution unit and/or the processor to store, or otherwise give or provide, a live copy or other live store indication 573 that the write-protected protected container page was live copied or otherwise live stored out of the protected container memory. In some embodiments, the execution unit may optionally have a live store indication logic or other unit 583 to provide this indication. This may be done in any of the various ways described elsewhere herein. As one specific example, the indication may be provided by configuring a particular bit (e.g., setting the bit to binary one according to one possible convention) in a header, control structure, or other data structure that is to be kept associated with the write-protected protected container page when it is stored out of the protected container memory (e.g., encrypted along with the write-protected protected container page). As shown, the live store indication 573 may optionally be stored with (e.g., encrypted with) the encrypted copy 572 of the write-protected protected container page. Alternatively, the indication may optionally be securely stored or preserved elsewhere (e.g., in on-die access restricted logic or another protected container control structure).

In some embodiments, the live store page out instruction when performed may also optionally be operative to cause the execution unit and/or the processor to increment, decrement, or otherwise update or change, the version 577 of the write-protected protected container page (e.g., in the version structure 526). In some embodiments, the execution unit may optionally have a version management logic or other unit 582 to change and preserve the version. In some embodiments, the changed version may also optionally be kept associated with the write-protected protected container page when it is stored out of the protected container memory (e.g., encrypted along with the write-protected protected container page). As shown, the version 574 may optionally be stored with (e.g., encrypted with) the encrypted copy 572 of the write-protected protected container page. Alternatively, the version may optionally be securely stored or preserved elsewhere (e.g., in on-die access restricted logic or another protected container control structure).

In some embodiments, the live store page out instruction when performed may also optionally be operative to cause the execution unit and/or the processor to encrypt the write-protected protected container page. In some embodiments, the execution unit may optionally have an encryption logic or other unit 534 (e.g., the cryptographic unit 234) to perform any such checks. In one aspect, this may optionally be an authenticated encryption. The encryption key 579 may optionally be used. In some embodiments, the encryption key 579 may optionally be a migratable or movable key, rather than a platform bound key (e.g., fused in the processor), which may be migrated or moved (e.g., with the protected container key structure as one of the special pages) from a source computer system to a destination computer system. As mentioned above, in some embodiments, the live store indication 573 and/or the version 574 may optionally be included (e.g., as an appended header or data structure) with the write-protected page 576 as part of the data that is encrypted, although the scope of the invention is not so limited.

In some embodiments, the copy page out instruction when performed may be operative to cause the execution unit and/or the processor to live copy or otherwise live store the write-protected protected container page 576 from the source memory location 575 in the protected container memory 502 to the destination location 571 in the regular memory as an encrypted copy 572 of the write-protected protected container page. In some embodiments, this live store operation may leave the write-protected protected container page 576 live and useable (e.g., valid and accessible) in the source memory location in the protected container memory. In some embodiments, the execution unit may optionally have a memory access logic or other unit 584 (e.g., a load store unit) to load the page and to store the encrypted page.

The execution unit 535 and/or the processor 503 may include specific or particular logic (e.g., transistors, integrated circuitry, or other hardware and/or firmware (e.g., instructions stored in non-volatile memory) potentially with a lesser amount of software) that is operative to perform the live store page out instruction. Although the illustrated execution unit is shown as a single unit, it is to be appreciated that the execution unit may also represent dispersed and/or distributed logic (e.g., dispersed and/or distributed within various components of the processor and its memory subsystem), which collectively represents the execution unit that perform the live store page out instruction.

To avoid obscuring the description, a relatively simple processor 503 has been shown and described. However, the processor may optionally include other processor components. For example, various different embodiments may include various different combinations and configurations of the components shown and described for any of FIGS. 8B, 9A, 9B, and 10. All of the components of the processor may be coupled together to allow them to operate as intended.

Figure 6:
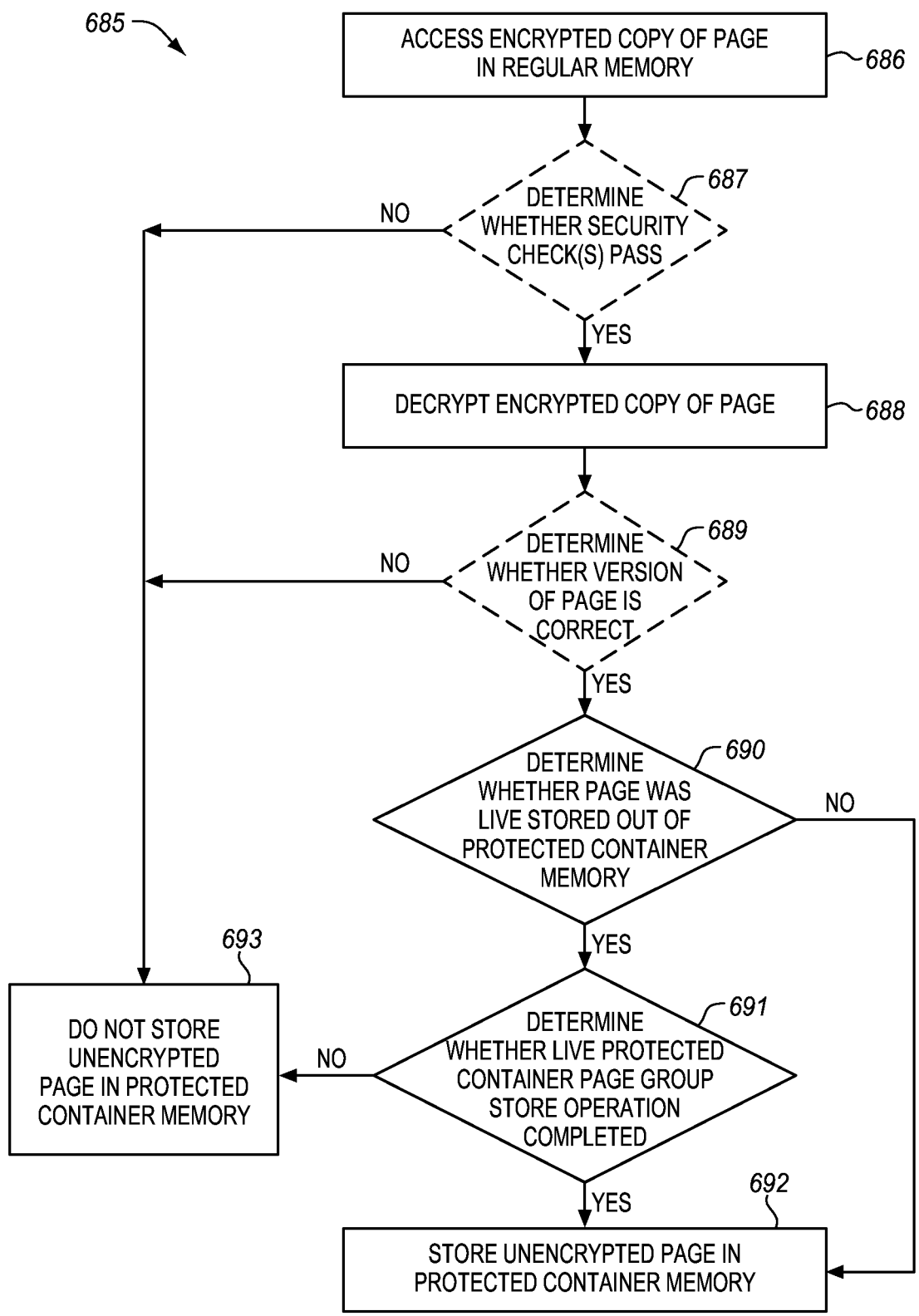
FIG. 6 is a block flow diagram of an example embodiment of a method of determining whether to load or otherwise store an encrypted copy of a protected container page from regular memory into a protected container memory.

FIG. 6 is a block flow diagram of an example embodiment of a method 685 of determining whether to load or otherwise store an encrypted copy of a protected container page from regular memory into a protected container memory. In various embodiments, the method may be performed by a processor, instruction processing apparatus, digital logic device, or integrated circuit. In some embodiments, the method may be performed by and/or with the processor 103-D of FIG. 1 and/or the processor 203 FIG. 2 and/or the processor 703 of FIG. 7. The components, features, and specific optional details described herein for the processor 103-D and/or the processor 203 and/or the processor 703 also optionally apply to the method. Alternatively, the method may be performed by and/or within a similar or different processor or apparatus. Moreover, the processor 103-D and/or the processor 203 and/or the processor 703 may perform methods the same as, similar to, or different than the method 685.

At block 686, the encrypted copy of the protected container page may be accessed in the regular memory. At block 687, a determination may optionally be made whether any optionally implemented security checks pass. The number and type of such optional security checks may vary from one implementation to another, depending in part on factors such as the desired level of security, and the particular way in which the protected container architecture is implemented. One optional security check may include optionally checking to ensure that protected container control structures that are to be used in the operation are compatible or otherwise appropriate for the operation. In other embodiments, additional checks may optionally be performed, or such checks may be omitted.

If one or more of the optionally implemented security check(s) do not succeed, the method may advance to block 693. At block 693, the encrypted copy of the protected container page may not be loaded or stored into the protected container memory. For example, a fault, exceptional, or other exceptional condition may optionally be signaled in order to allow a privileged entity (e.g., an OS and/or a VMM) to investigate. Alternatively, if the optionally implemented security checks succeed, the method may advance to block 688.

At block 688, the encrypted copy of the protected container page of the protected container memory may be decrypted. In some embodiments, a cryptographic unit of the processor (e.g., the cryptographic unit 234) may be used to decrypt the encrypted copy. In some embodiments, the decryption may be performed by, or at least predominantly by, on-die hardware and/or firmware logic of the processor, instead of predominantly by a software sequence of machine instructions or higher level instructions. In some embodiments, a migratable or movable cryptographic key from a migratable or movable protected container control structure (e.g., the protected container key structure 227) may optionally be used.

At block 689, a determination may optionally be made whether a version of the protected container page is correct. In some embodiments, this may include comparing a known most current/updated version of the protected container page and a version associated with the protected container page at the time when it was originally stored out of protected container memory. By way of example, according to one possible approach, every time a protected container page is to be stored out of the protected container memory (e.g., paged out through regular paging or live stored out), it may be associated with (e.g., tagged with and encrypted with in order to bind them) a unique version, and the unique version may be stored or preserved for later use, and later updated as needed if other encrypted copy or version of the same page is stored out of the protected container memory again. The two different version copies may need to match. Forcing the two versions to match may help to ensure that only the most recent version of the protected container page is within the protected container memory. If the two versions do not match, the method may advance to block 693, where the unencrypted page may not be loaded or stored into the protected container memory. If the versions match, the method may advance to block 690 and continue to perform additional checks. Ultimately, if the page is loaded into the protected container memory, the stored or preserved unique version may optionally in some cases be cleared or otherwise invalidated to help to ensure that the page is loaded at most once into the protected container memory. In some embodiments, the same version structure may optionally be used to store both versions of protected container pages that are paged out of the protected container memory through regular paging, as well as versions of protected container pages that are live stored out of the protected container memory, as previously described.

At block 690, a determination may be made whether the protected container page was live copied or otherwise live stored out of the protected container memory while a copy of the protected container page was allowed to remain live and useable (e.g., valid and accessible) in the protected container memory. In some embodiments, this may include checking or determining whether there is an indication associated with the page that the page was live stored out of protected container memory. In some embodiments, this may include using the indication provided at block 455 of FIG. 4 and/or the live store indication 573 of FIG. 5, including the variations and alternatives mentioned therefore. This indication may be stored, or otherwise given or provided, in different structures or locations, as previously described. In some embodiments, the indication may optionally be encrypted along with the encrypted copy of the protected container page that was accessed at block 686, although the scope of the invention is not so limited.

If the determination is that the page was not live stored out of the protected container memory (i.e., "no" is the determination at block 690), the method may advance to block 692, where the unencrypted page may be loaded or otherwise stored in the protected container memory (unless any additional optional security checks are desired to be performed first). Alternatively, if the determination is that the page was live stored out of the protected container memory (i.e., "yes" is the determination at block 690), the method may advance to block 691.

At block 691, an additional security check or determination may be made when the page was live stored out of the protected container memory that is not needed when the page was not live stored out of the protected container memory. Specifically, a determination may be made at block 691 whether a corresponding or associated live protected container page group store operation (i.e., which includes or is associated with the live store operation used to store the page out of the protected container memory) has completed.

In some embodiments, the live protected container page group store operation may have been used to live store at least some of a group of protected container pages from protected container memory into regular memory (e.g., those at block 343 of FIG. 3). For example, in some embodiments, the group may represent all of the protected container pages of a given protected container (e.g., which is being migrated or moved from a source computer system to a destination computer system). The live protected container page group store operation may only be indicated to be completed when all of the pages of the group have been stored into regular memory. As one specific example, the completion may be indicated when all of the pages of the given protected container have been stored from the protected container memory of the source computer system to regular memory of the destination computer system. As another specific example, the completion may be indicated when all of the pages of the given protected container have been stored from the protected container memory of the source computer system to the regular memory of the source computer system. In some embodiments, a trusted entity (e.g., the trusted entity 223) or highly privileged and/or relatively trusted system software (e.g., a VMM)) may indicate when the live protected container page group store operation has completed.

The completion of the live protected container page group store operation may be indicated in different ways in different embodiments. By way of example, in some embodiments, a comparison of two values may optionally be used. For example, a first value may represent a snapshot or current value (e.g., a snapshot migration counter value) captured at the time the protected container page was live stored out of the protected container memory and may be stored or preserved in association with the encrypted copy of the protected container page in the regular memory (e.g., encrypted along with the encrypted copy of the protected container page or stored in an entry of a protected container control structure corresponding to the page). A second value (e.g., a current/updatable migration counter value) may represent a current potentially updated value that may be or otherwise updated if the live protected container page group store operation has completed. For example, the second value may represent a real time counter of completed migrations. The second value may be stored in a protected container control structure (e.g., the protected container key structure 227) or otherwise secured. In order to store the encrypted copy of the protected container page that was live copied out, the first and second values may need to have a certain relationship (e.g., the first value may need to be less than the second value). By way of example, initially all protected container pages live copied out during the first migration may be given a first value of zero and when the first migration is completed the second value may be changed to one, subsequently all protected container pages live copied out during the second migration may be given a first value of one and when the second migration is completed the second value may be changed to two, and so on. In this way, if an attempt is made to store a live copied out protected container page before the group copy has completed, it may not have the needed relationship (e.g., the first value may be equal to and/or not less than the second value), since the group copy hasn't completed, so the store into the protected container memory may not be allowed.

If the determination is that the live protected container page group store operation has not completed (i.e., "no" is the determination at block 691), the method may advance to block 693, where the unencrypted page may not be stored in the protected container memory. Advantageously, this may help to ensure that only one true copy of a protected container page is present in protected container memory at a time, which may help to prevent cloning and/or replay, when live store out of protected container memory operations are employed. Alternatively, if the determination is that the live protected container page group store operation has completed (i.e., "yes" is the determination at block 691), the method may advance to block 692. At block 692, the unencrypted protected container page may be stored back into the protected container memory. The version or replay value may also optionally be cleared.

One illustrate example of a suitable method is shown in FIG. 6, although many modifications to the method are contemplated. Operations may optionally be added to and/or removed from the method. For example, an alternate method may include only blocks 686, 688, and 690. As another example, another alternate method may include only blocks 690 and 691. As yet another example, another alternate method may include only blocks 691 and 692 or 691 and 693. In addition, alternate embodiments may optionally perform certain of the operations in different order, combine certain operations, overlap certain operations, etc. For example, blocks 687 and 689 may each optionally be performed at different relative locations in the method.

In some embodiments, one or more of the blocks of the method may optionally be performed in response to a single instruction. As one example, any of the illustrated blocks may optionally be performed in response to such a single instruction or control primitive. As another example, blocks 690, 691, 692, and 693 may be performed in response to such a single instruction or control primitive. As yet another example, blocks 691, 692, and 693 may be performed in response to such a single instruction or control primitive. These are just a few illustrative examples.

Figure 7:
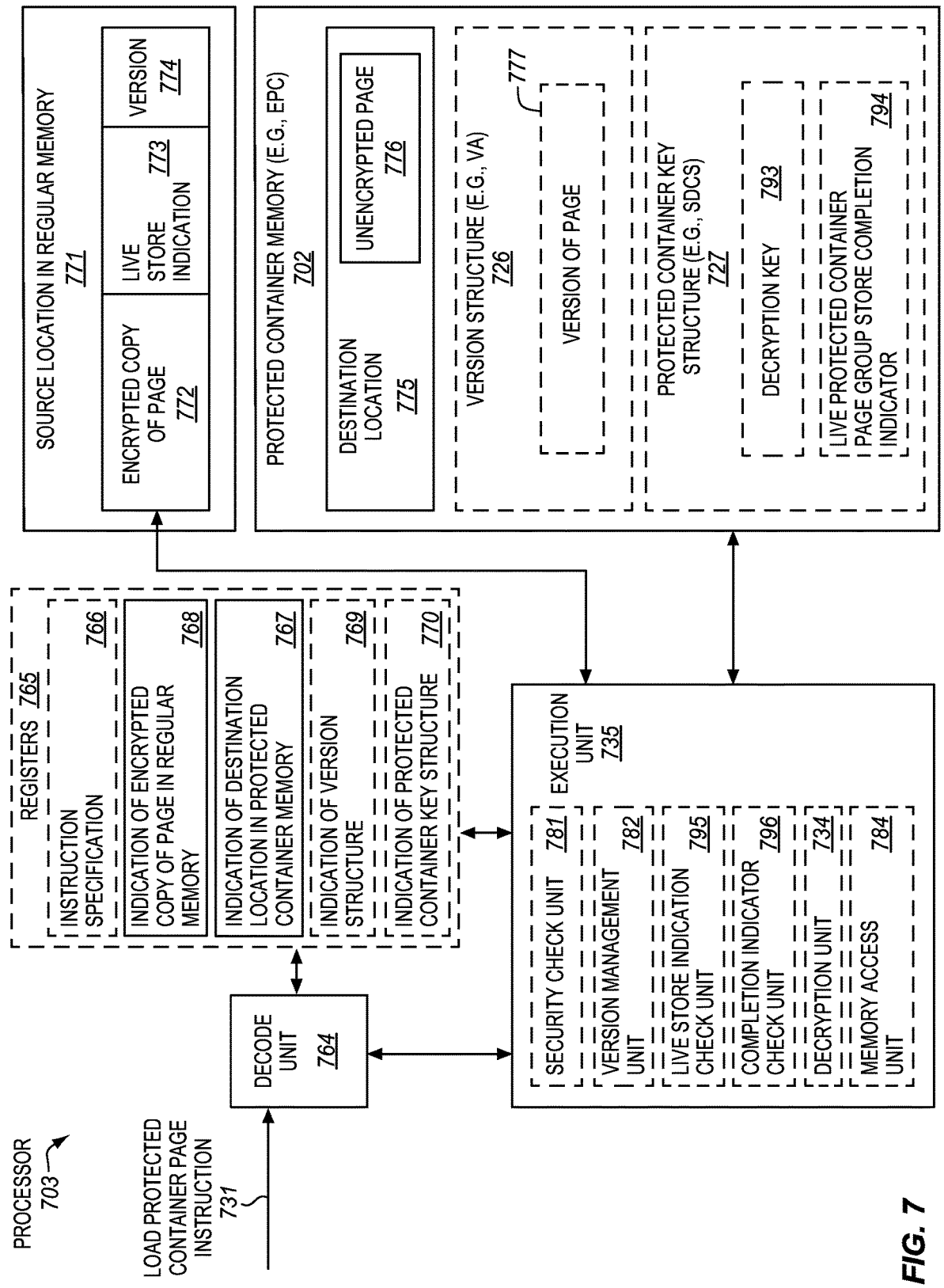
FIG. 7 is a block diagram of an embodiment of a processor that is operative to perform an embodiment of a load protected container page instruction.

FIG. 7 is a block diagram of an embodiment of a processor 703 that is operative to perform an embodiment of a load protected container page instruction 731. The processor 703 may optionally be the same as the processor 503 of FIG. 5. Alternatively, the processor 703 may optionally be similar to or different than the processor 503. The processor includes a decode unit 764 operative to decode the load protected container page instruction, an execution unit 735 operative to perform the load protected container page instruction, and registers 765 operative to store memory address information or other indications associated with the load protected container page instruction. These components may optionally be similar to, or the same as, (e.g., have any one or more characteristics that are similar to or the same as) the correspondingly named components of FIG. 5, except for any aspects pertaining only to the live store protected container page out instruction 530. Moreover, the load protected container page instruction may cause the processor 703 to interact with an encrypted copy 772 of a protected container page in a regular memory, and a protected container page 776 in a protected container memory 702. These components may optionally be similar to, or the same as, (e.g., have any one or more characteristics that are similar to or the same as) the corresponding components of FIG. 5, except for any aspects pertaining only to the live store protected container page out instruction 530. To avoid obscuring the description, the different and/or additional characteristics of the embodiment of FIG. 7 will primarily be described, without repeating all the characteristics which may optionally be the same or similar to those described for the embodiment of FIG. 5.

The load protected container page instruction 731 may represent a macroinstruction, machine code instruction, machine language instruction, or other instruction or control signal of an instruction set of the processor. In some embodiments, the instruction may optionally have an opcode to indicate the operation to be performed. In other embodiments, the instruction may explicitly specify (e.g., through one or more fields or a set of bits), or otherwise indicate (e.g., implicitly indicate) a register having additional instruction specification 766 (e.g., a leaf function) that in combination with the opcode indicate the operation to be performed.

In some embodiments, the load protected container page instruction may explicitly specify (e.g., through one or more fields or a set of bits in its encoding), or otherwise indicate (e.g., implicitly indicate) a source memory location 771 in regular memory where an encrypted copy 772 of a protected container page is stored, and a destination memory location 775 in a protected container memory 702 where an unencrypted protected container page 776 is to be stored in response to the instruction. In some embodiments, the instruction may optionally explicitly specify or otherwise indicate a source version structure 726 (e.g., the version structure 226, a version array (VA), etc.), where a version 777 of the protected container page is stored. Alternatively, the version may optionally be stored elsewhere (e.g., in another protected container structure or in on-die access restricted logic of the processor). In some embodiments, the live store page out instruction may optionally explicitly specify or otherwise indicate source protected container key structure 727 (e.g., the key structure 227, an SDCS, etc.) in the protected container memory, wherein where one or more encryption keys are stored, and where a live protected container page group store operation completion indicator 794 is to be stored in response to the instruction. Alternatively, the decryption key and/or the completion indicator may optionally be stored elsewhere (e.g., in other protected container structures and/or in on-die access restricted logic of the processor).

These storage locations or structures may be indicated in various ways as discussed above. In some embodiments, the instruction may specify or indicate a first register that is to store an indication 768 of the encrypted copy of the protected container page, and a second register that is to store an indication 767 of the destination memory location in the protected container memory. In embodiments where the version 777 is optionally stored in the version structure 726, the instruction may also indicate a third register that is to store an indication 769 of the version structure. Likewise, in embodiments where the decryption key 793 is stored and/or the live protected container page group store completion indicator is to be stored in the protected container key structure 727, the instruction may indicate a fourth register that is to store an indication 770 of the protected container key structure. Alternatively, other structures or locations may optionally be indicated if the version and the completion indicator are to be stored elsewhere. These structures or storage locations may be indicated in various ways according to various memory addressing mechanisms.

The processor includes a decode unit or decoder 764. The decode unit may receive and decode the load protected container page instruction 731. The decode unit may output one or more relatively lower-level instructions or control signals, which reflect, represent, and/or are derived from the relatively higher-level load protected container page instruction. The execution unit 735 is coupled with the decode unit 764 and the registers 765. In some embodiments, the execution unit may be operative in response to and/or as a result of the load protected container page instruction (e.g., in response to one or more instructions or control signals decoded from the load protected container page instruction and/or in response to the load protected container page instruction being decoded and/or in response to the load protected container page instruction being provided to the decode unit) to perform the load protected container page instruction. The execution unit 735 and/or the processor 703 may include specific or particular logic (e.g., transistors, integrated circuitry, or other hardware and/or firmware (e.g., instructions stored in non-volatile memory) potentially with a lesser amount of software) that is operative to perform the load protected container page instruction. Although the illustrated execution unit is shown as a single unit, it is to be appreciated that the execution unit may also represent dispersed and/or distributed logic, which collectively represents the execution unit that perform the load protected container page instruction.

In some embodiments, the load protected container page instruction when performed may be operative to cause the execution unit and/or the processor to perform any optionally implemented security checks. In some embodiments, the execution unit may optionally have a security check logic or other unit 781 to perform any such checks. The number and type of such optional security checks may vary from one implementation to another, depending in part on factors such as the desired level of security, and the particular way in which the protected container architecture is implemented. One optional security check is a check to ensure that protected container control structures that are to be used in the operation are compatible or otherwise appropriate for the operation. In other embodiments, additional checks may optionally be performed, or such checks may be omitted. If one or more of the optionally implemented security checks do not succeed, a fault or other exceptional condition may be signaled and/or further performance of the instruction may stop.

In some embodiments, if any such optionally implemented security checks are performed successfully, the performance of the load protected container page instruction may continue. In some embodiments, this may further cause the execution unit and/or the processor to decrypt the encrypted copy 772 of the protected container page. In one aspect, this may optionally be an authenticated decryption. In some embodiments, the execution unit may optionally have a decryption logic or other unit 734 (e.g., the cryptographic unit 234) to perform the decryption. In some embodiments, the decryption key 793 may optionally be a migratable or movable key, rather than a platform bound key (e.g., fused in the processor), which may have been migrated or moved (e.g., with the protected container key structure) from a source computer system to a destination computer system.

In some embodiments, the load protected container page instruction when performed may also optionally be operative to cause the execution unit and/or the processor to determine whether a version of the protected container page is correct. This may be done as described elsewhere herein. If the version is not correct, performance of the instruction may stop without storing the page into the protected container memory.

In some embodiments, the load protected container page instruction when performed may also optionally be operative to cause the execution unit and/or the processor to determine whether the encrypted copy 772 of the protected container page had been live stored out of the protected container memory, while a copy of the same protected container page was allowed to remain live and useable (e.g., valid and accessible) in the protected container memory. In some embodiments, this may include checking or determining whether there is an indication associated with the page that the page was live stored out of protected container memory. In some embodiments, this may include using the indication provided at block 455 of FIG. 4 and/or the live store indication 573 of FIG. 5, including the variations and alternatives mentioned therefore. This indication may be stored, or otherwise given or provided, in different structures or locations, as previously described. As shown, in some embodiments, the live store indication 773 may optionally be encrypted along with the encrypted copy 772 of the protected container page, although the scope of the invention is not so limited.

In some embodiments, the load protected container page instruction when performed may also optionally be operative to cause the execution unit and/or the processor to determine, in cases when the page was live stored out of the protected container memory, whether a corresponding or associated live protected container page group store operation (i.e., which includes or is associated with the live store operation used to store the page out of the protected container memory) has completed. This determination may be made as described elsewhere herein. In some embodiments, this may be performed as described at block 691, including the variations and alternatives mentioned therefor.

In some embodiments, the load protected container page instruction when performed, when the live protected container page group store operation is determined to have been completed, may be operative to store the unencrypted protected container page 776 in the destination memory location. However, when the live protected container page group store operation is determined not to have been completed, the load protected container page instruction may stop performance without storing the unencrypted protected container page 776 in the destination memory location.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 864. It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
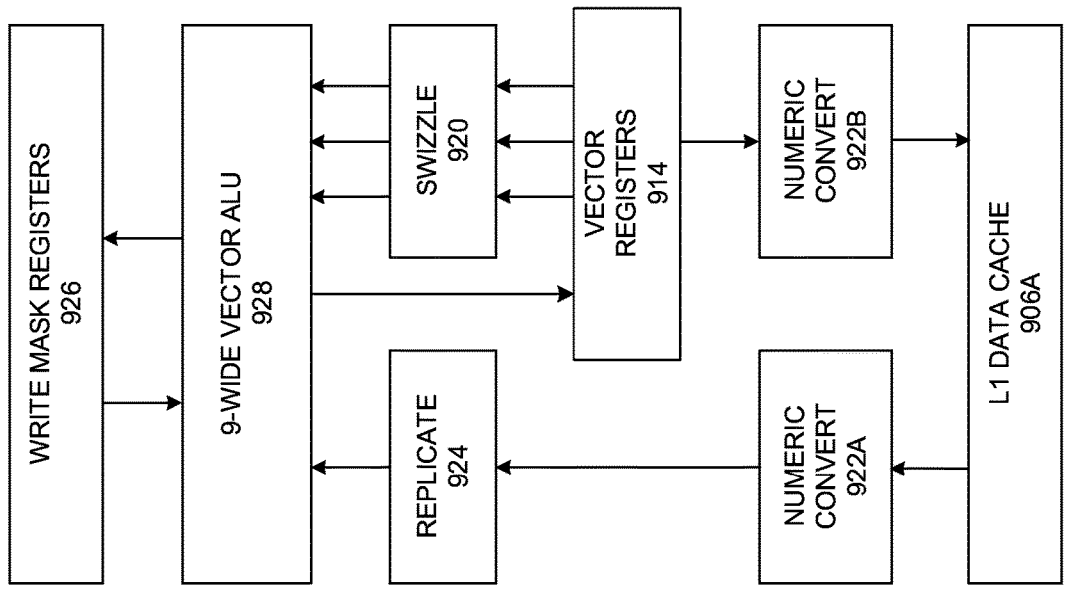
FIG. 9B is a block diagram of an embodiment of an expanded view of part of the processor core of FIG. 9A.
Figure 9A:
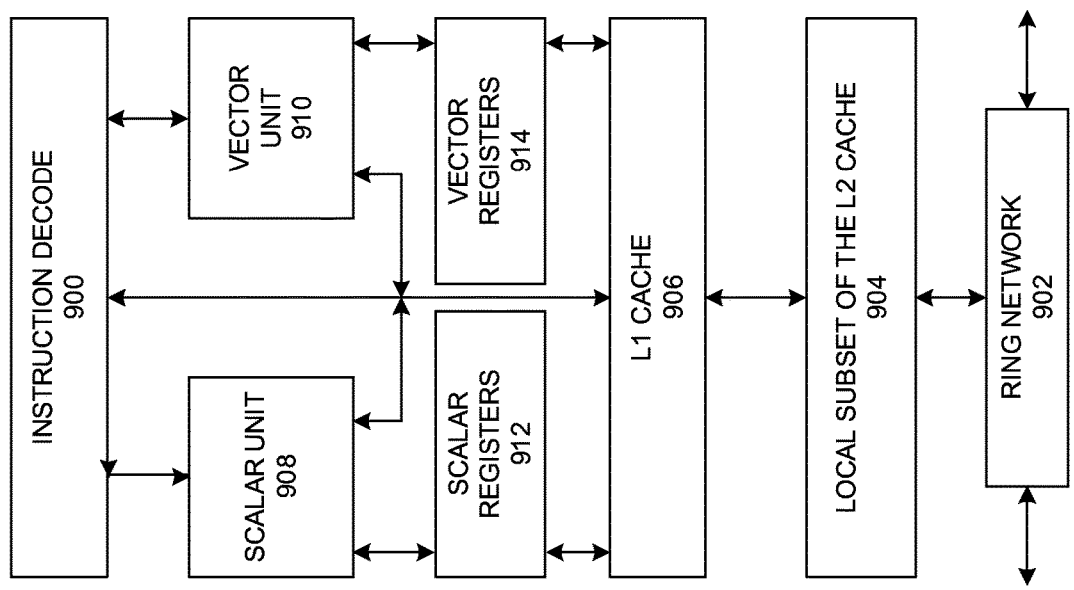
FIG. 9A is a block diagram of an embodiment of a single processor core, along with its connection to the on-die interconnect network, and with its local subset of the Level 2 (L2) cache.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 1912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
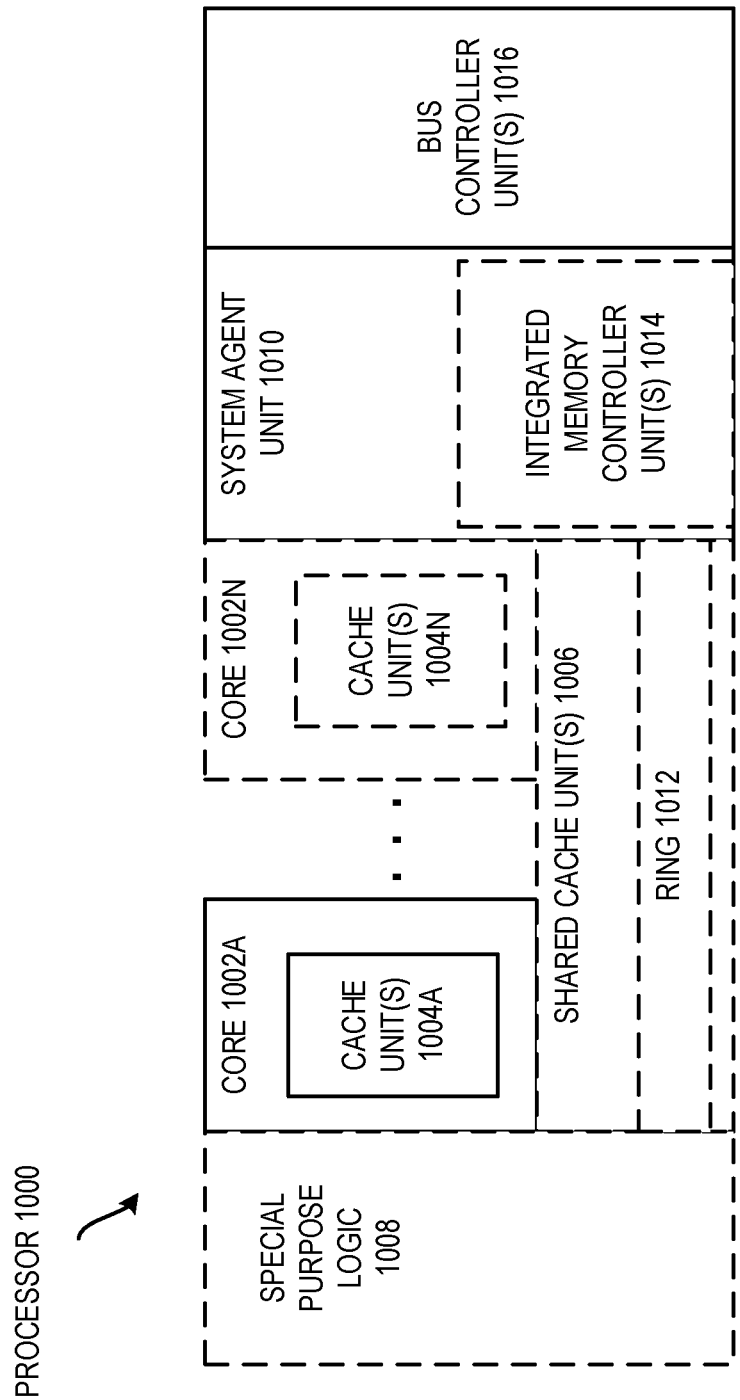
FIG. 10 is a block diagram of an embodiment of a processor that may have more than one core, may have an integrated memory controller, and may have integrated graphics.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
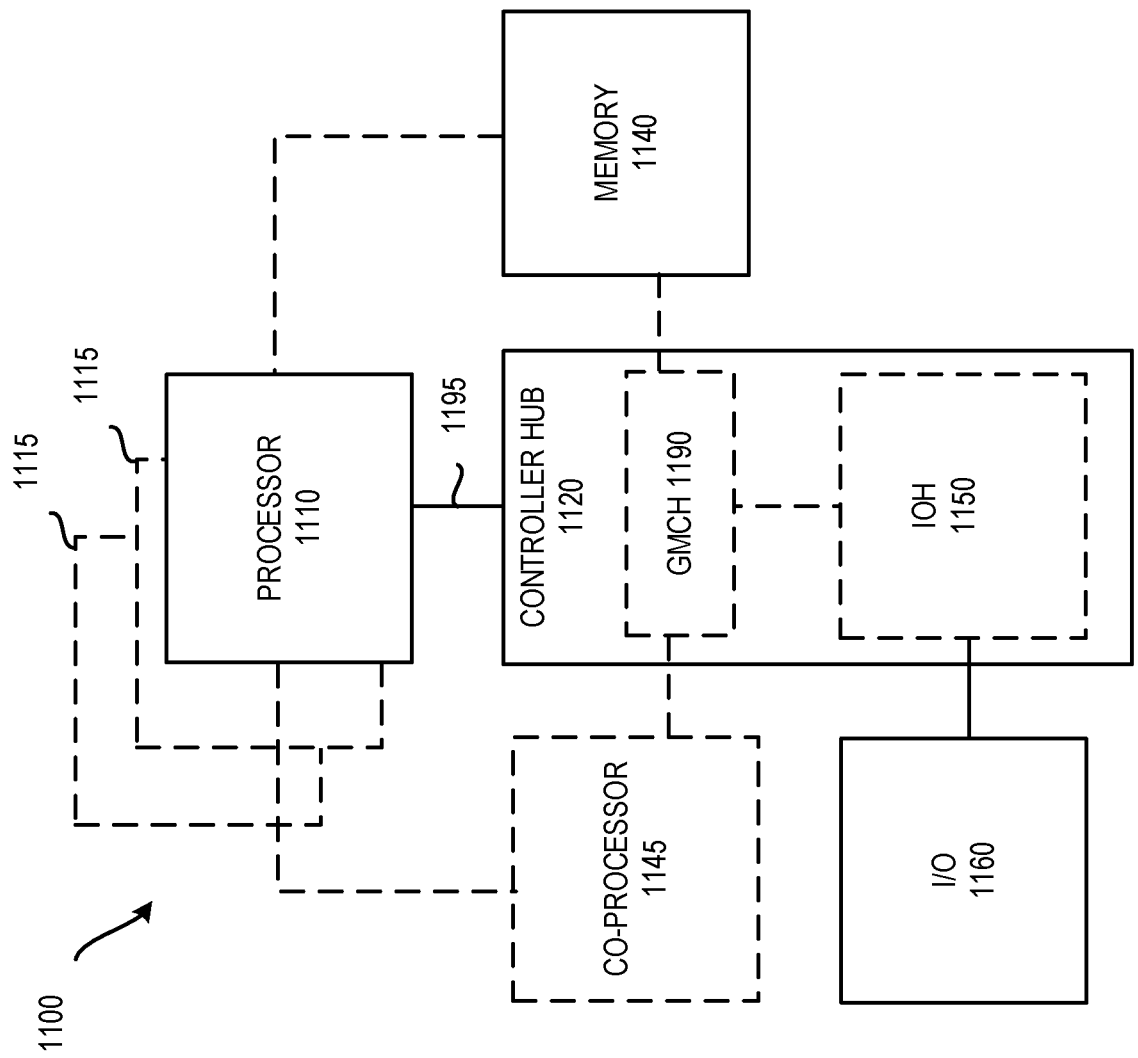
FIG. 11 is a block diagram of a first embodiment of a computer architecture.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
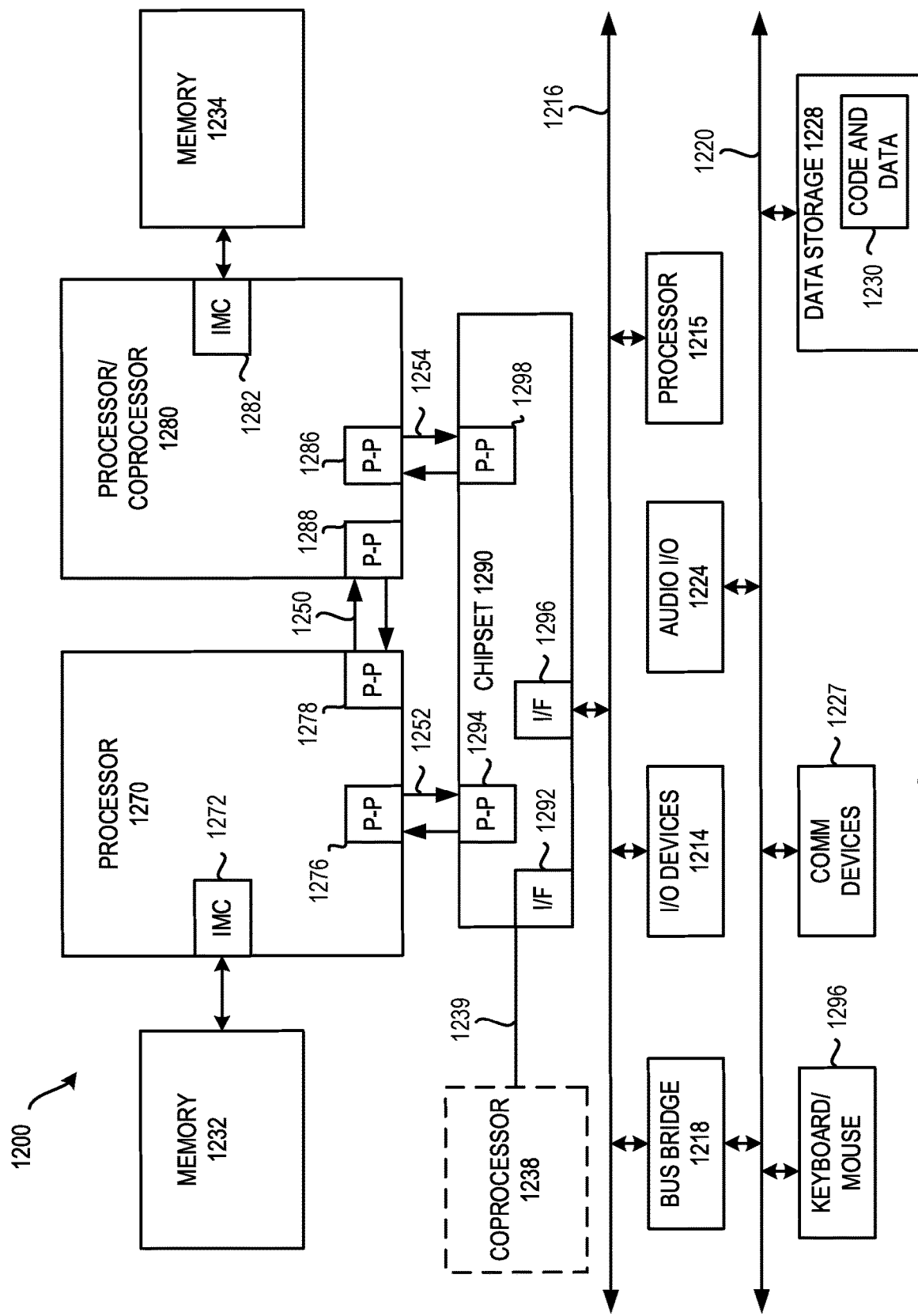
FIG. 12 is a block diagram of a second embodiment of a computer architecture.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
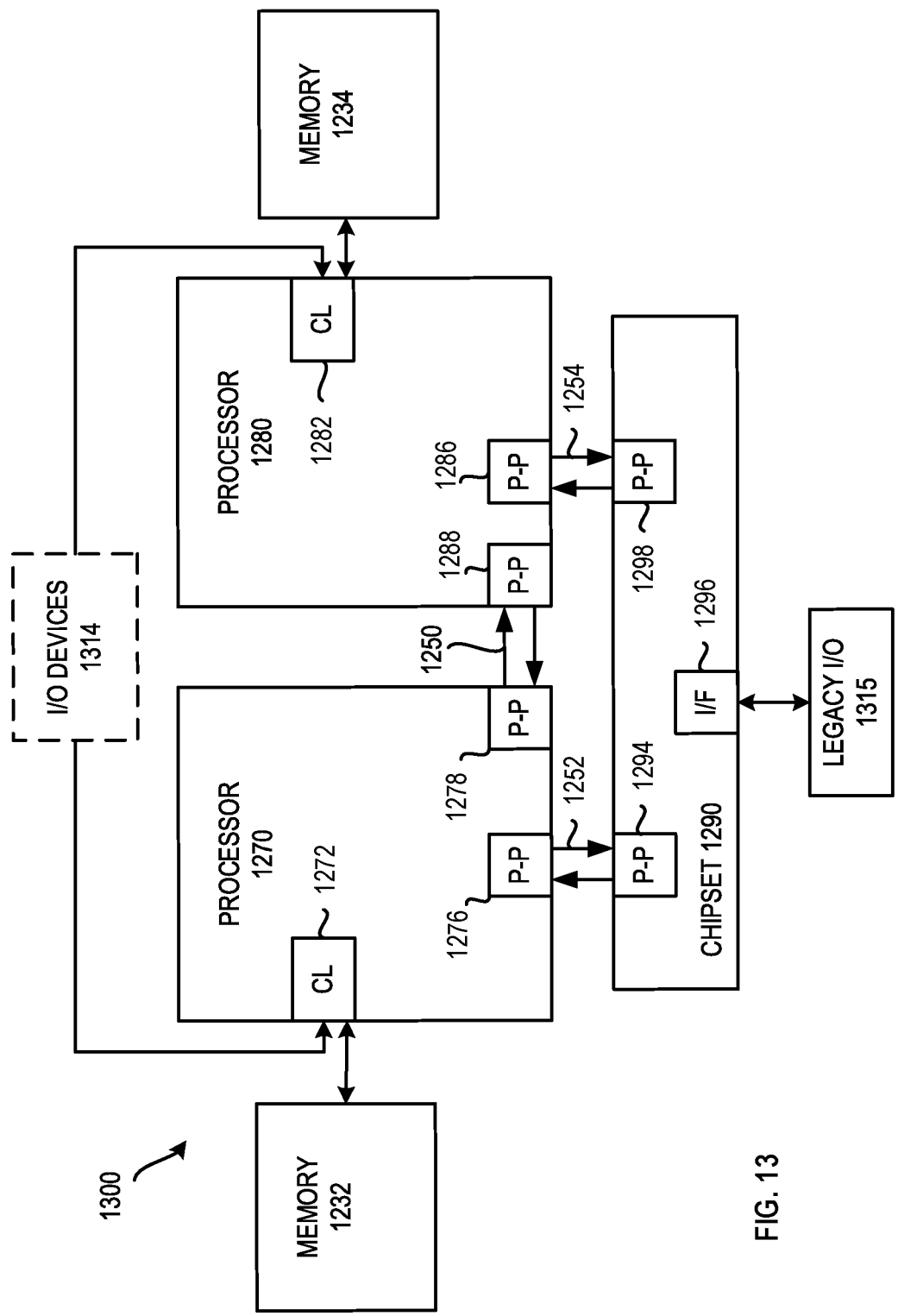
FIG. 13 is a block diagram of a third embodiment of a computer architecture.

Referring now to FIG. 13, shown is a block diagram of a second more specific exemplary system 1300 in accordance with an embodiment of the present invention Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
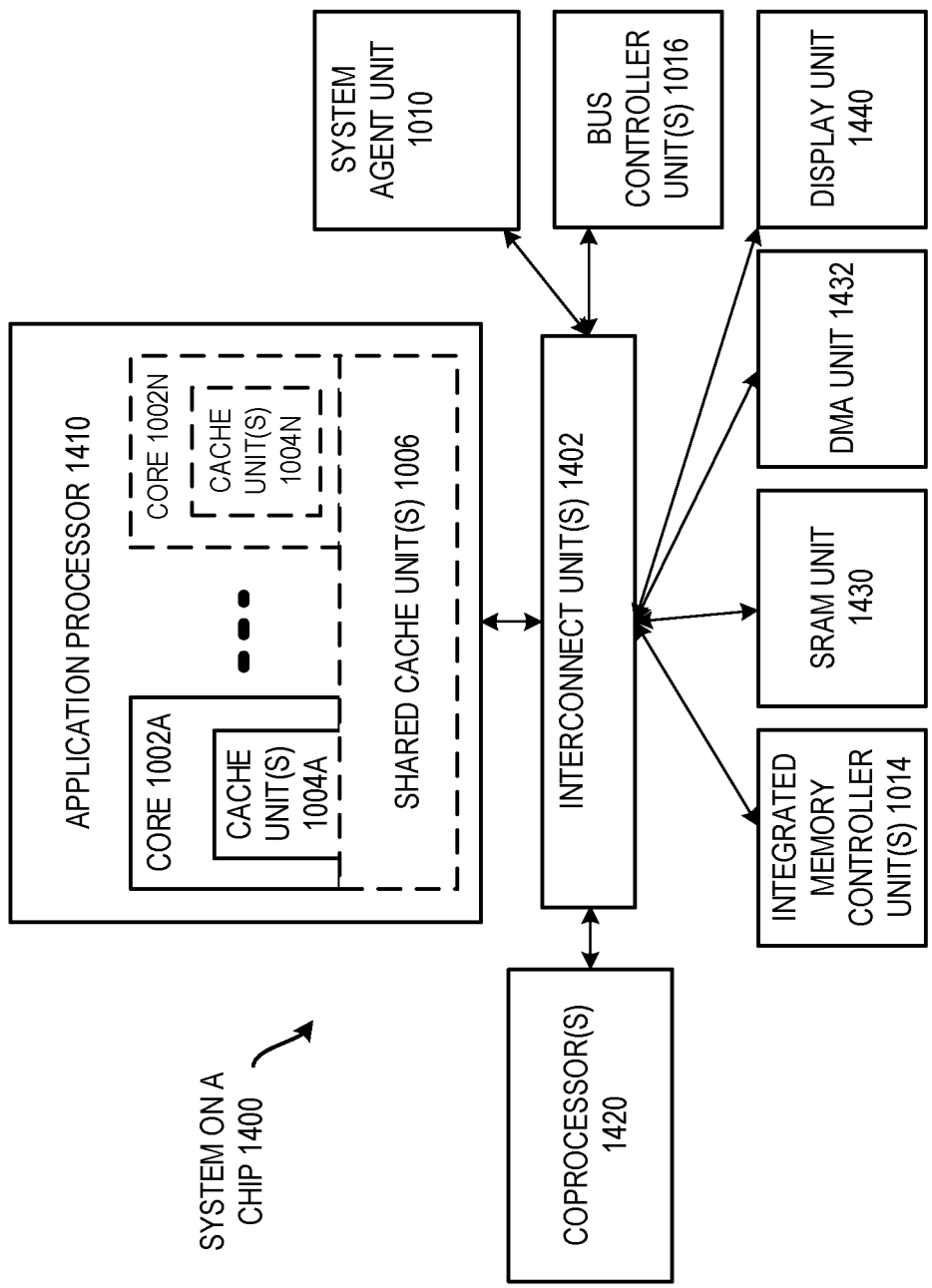
FIG. 14 is a block diagram of a fourth embodiment of a computer architecture.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 132A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
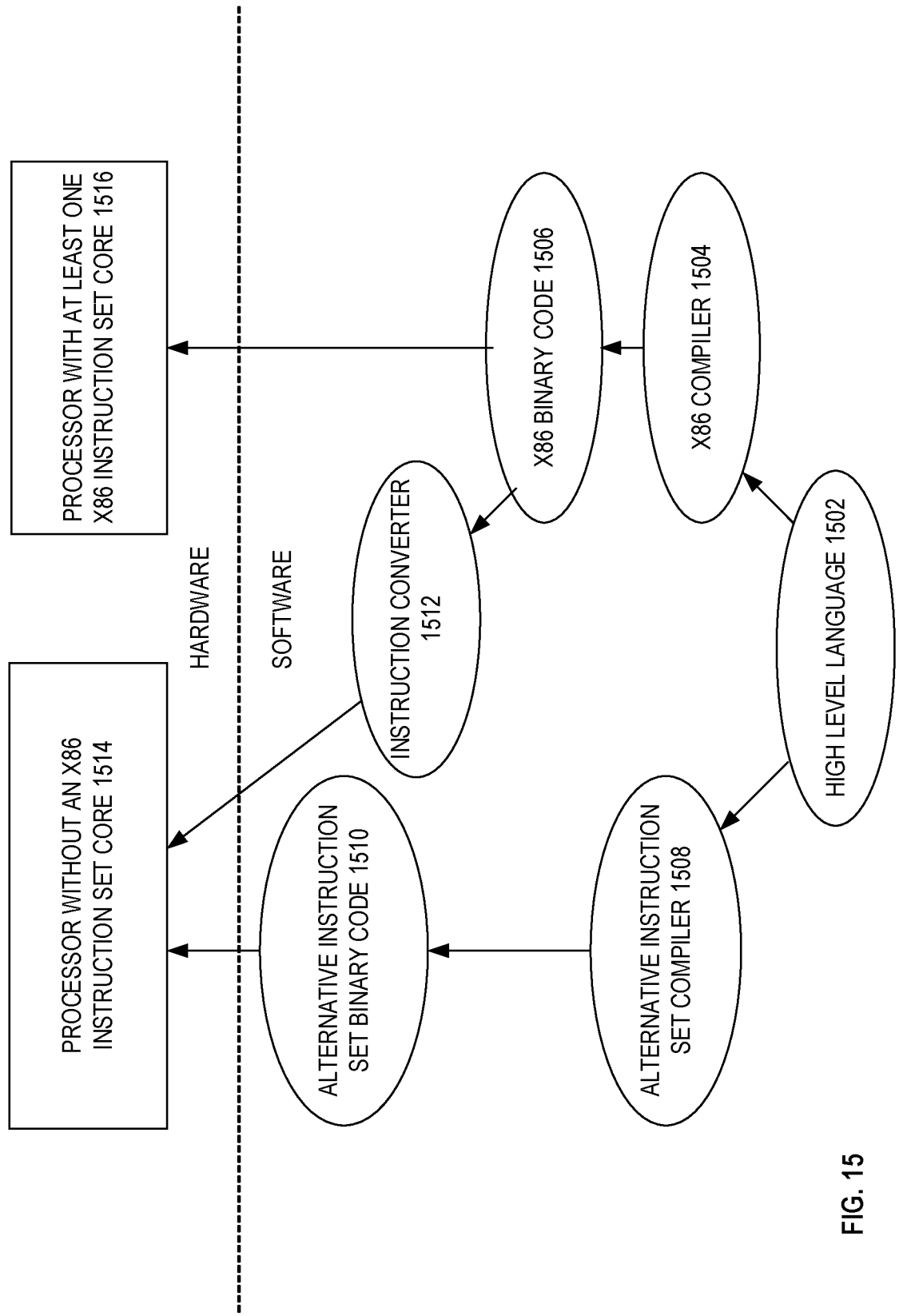
FIG. 15 is a block diagram of use of a software instruction converter to convert binary instructions in a source instruction set to binary instructions in a target instruction set, according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Components, features, and details described for any of FIGS. 1-3 may also optionally apply to any of FIGS. 4-7. Components, features, and details described for any of the processors disclosed herein (e.g., 203, 503, 703) may optionally apply to any of the methods disclosed herein (e.g., 450, 685), which in embodiments may optionally be performed by and/or with such processors. Any of the processors described herein (e.g., 203, 503, 703) in embodiments may optionally be included in any of the systems disclosed herein (e.g., any of the systems of FIGS. 11-14). Any of the processors disclosed herein (e.g., 203, 503, 703) may optionally, in some embodiments, have component(s) of any of the microarchitectures shown herein (e.g., in FIGS. 8B, 9A, 9B, 10).

Processor components disclosed herein may be said to perform an operation. For example, a decoder may be said to decode an instruction, an execution unit may be said to make a determination or perform a security check. For clarity, it is to be understood that these expressions do not imply that the processor components are in operation or use, but rather refer to what the processor components are capable of doing, or able or operative to do, if or when they are in operation, but in the processor or apparatus claims, the processor or apparatus is not in use.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a decode unit to decode an instruction that is to indicate a source encrypted copy of a protected container page that is to be stored in a regular memory, and that is to indicate a destination page that is to be in a first protected container memory. The processor also includes an execution unit coupled with the decode unit. The execution unit, in response to the instruction, is to determine whether the protected container page was live stored out, while able to remain useable in, protected container memory. The execution unit is also to perform a given security check, before a determination to store the protected container page to the destination page, if the determination is that the protected container page was live stored out. The execution unit is not to perform the given security check, if the determination is that the protected container page was not live stored out.

Example 2 includes the processor of Example 1, in which the execution unit, in response to the instruction, is to determine whether the protected container page was live stored out including to determine whether a value indicates that the protected container page was live stored out.

Example 3 includes the processor of Example 2, in which the value is to be encrypted with the source encrypted copy of the protected container page.

Example 4 includes the processor of Example 2, in which the value is to be stored in the first protected container memory.

Example 5 includes the processor of any one of Examples 2 to 4, in which the decode unit is to decode a second instruction, and the processor is to perform the second instruction to live store the protected container page out of the protected container memory, and optionally configure the value to indicate that the protected container page was live stored out.

Example 6 includes the processor of any one of Examples 1 to 5, in which the execution unit, in response to the instruction, is to perform the given security check including to determine whether a live protected container page group store operation, which is to have been used to store a group of protected container pages including the protected container page out of the protected container memory, is to have been completed.

Example 7 includes the processor of Example 6, in which the execution unit, in response to the instruction, is to determine not to store the protected container page to the destination page when the determination is that the live protected container page group store operation is not to have been completed.

Example 8 includes the processor of any one of Examples 6 to 7, in which the live protected container page group store operation is to include at least to store all protected container pages of a protected container out of the protected container memory, from which the protected container page was live stored out, of a source computer system.

Example 9 includes the processor of Example 8, in which the live protected container page group store operation is also to include to store said all protected container pages of the protected container to the regular memory which is to be of a destination computer system.

Example 10 includes the processor of any one of Examples 6 to 9, in which to determine whether the live protected container page group store operation is to have been completed includes to compare a snapshot value with a current value. Also, optionally in which the snapshot value is to have been taken at a time when, and is not to have been updated since, the protected container page was live stored out. Also, optionally in which the current value is to have been taken at a current time, and is to have been updated since the protected container page was live stored out, if thereafter the live protected container page group store operation is to have been completed.

Example 11 includes the processor of Example 10, in which the snapshot value is to be encrypted with the encrypted copy of the protected container page. Also, optionally in which the current value is to be stored in the regular memory.

Example 12 includes the processor of any one of Examples 1 to 11, in which the execution unit, in response to the instruction, is also to access a version of the protected container page from a version structure. Also, optionally in which the version structure is to be used to store both versions of protected container pages that are to have been live stored out as well as versions of protected container pages that are to have been paged out through paging.

Example 13 includes the processor of any one of Examples 1 to 12, in which the decode unit is to decode the instruction that is to indicate the source encrypted copy of the protected container page which is to be a secure enclave page. Also, optionally in which the instruction is to indicate the destination page that is to be in the first protected container memory which is to be an enclave page cache.

Example 14 is a processor that includes an interface to receive a control primitive, and a core coupled with the interface. The processor, in response to the control primitive, is to access an encrypted copy of a protected container page that is to be stored in a regular memory, and determine whether the protected container page was live stored out, while able to remain useable in, protected container memory. The processor, in response to the control primitive, is also to perform a given security check, before determining to store the protected container page to a destination page that is to be in a first protected container memory, if the determination is that the protected container page is to have been live stored out. The processor, in response to the control primitive, is not to perform the given security check, if the determination is that the protected container page is not to have been live stored out.

Example 15 includes the processor of Example 14, in which the core, in response to the control primitive, is to determine whether the protected container page was live stored out including to determine whether a value, which is optionally to be one of encrypted with the encrypted copy of the protected container page and optionally stored in the first protected container memory, is to indicate that the protected container page was live stored out.

Example 16 includes the processor of any one of Examples 14 to 15, in which the core, in response to the control primitive, is to perform the given security check including to determine whether a live protected container page group store operation, which is to have been used to store a group of protected container pages including the protected container page out of the protected container memory, is to have been completed.

Example 17 is a method performed by a processor that includes accessing an encrypted copy of a protected container page stored in a regular memory, and determining whether the protected container page was live stored out, while able to remain useable in, protected container memory. The method also includes performing a given security check, before determining to store the protected container page to a destination page in a first protected container memory, if it was determined that the protected container page was live stored out. Or, the method includes not performing the given security check, if it was determined that the protected container page was not live stored out.

Example 18 includes the method of Example 17, in which the determining includes determining whether a value, which is optionally one of encrypted with the encrypted copy of the protected container page and optionally stored in the first protected container memory, indicates that the protected container page was live stored out.

Example 19 includes the method of anyone of Examples 17 to 18, in which the determining includes determining that the protected container page was live stored out. Also, optionally in which the performing the given security check including determining whether a live protected container page group store operation, which was used to store a group of protected container pages including the protected container page out of the protected container memory, has completed.

Example 20 includes the method of Example 19, in which the live protected container page group store operation includes a live migration of all protected container pages of a protected container from the protected container memory, from which the protected container page was live stored out, and which is to be of a source computer system, to the regular memory, which is to be of a destination computer system.

Example 21 is a computer system that includes a bus or other interconnect, and a processor coupled with the interconnect. The processor is to receive an instruction that is to indicate a source encrypted copy of a protected container page that is to be stored in a regular memory, and that is to indicate a destination page that is to be in a first protected container memory. The processor, in response to the instruction, is to determine whether the protected container page was live stored out, while able to remain useable in, protected container memory, and is to perform a given security check, before a determination to store the protected container page to the destination page, if the determination is that the protected container page was live stored out. The given security check is to include a determination whether a live protected container page group store operation, which is to have been used to store a group of protected container pages including the protected container page out of the protected container memory, is to have been completed. Or, the given security check is not to be performed, if the determination is that the protected container page was not live stored out. The system also includes a dynamic random access memory (DRAM) coupled with the interconnect. The DRAM optionally stores a set of instructions. The set of instructions, when executed by the processor, are to cause the processor to perform operations including optionally to store an indication that the live protected container page group store operation has been completed when it has been completed.

Example 22 includes the computer system of Example 21, in which the processor, in response to the instruction, is to determine whether the protected container page was live stored out including to determine whether a value, which is optionally to be one of encrypted with the encrypted copy of the protected container page and optionally stored in the first protected container memory, indicates that the protected container page was live stored out.

Example 23 includes an article of manufacture including an optionally non-transitory machine-readable medium which is optionally a storage medium. The non-transitory machine-readable storage medium provides or optionally stores one or more instructions that, if performed by a machine, are to cause the machine to perform operations including to access an encrypted copy of a protected container page that is to be stored in a regular memory, and to determine whether the protected container page was live stored out, while able to remain useable in, protected container memory. The operations also include to perform a given security check, before a determination to store the protected container page to a destination page in a first protected container memory, if it was determined that the protected container page was live stored out. Or, the operations include not to perform the given security check, if it was determined that the protected container page was not live stored out.

Example 24 includes the article of manufacture of Example 23, in which the one or more instructions to cause the machine to determine whether the protected container page was live stored out include one or more instructions to cause the machine to determine whether a value, which is optionally to be one of encrypted with the encrypted copy of the protected container page and optionally stored in the first protected container memory, is to indicate that the protected container page was live stored out.

Example 25 includes the article of manufacture of any one of Examples 23 to 24, in which the one or more instructions to cause the machine to perform the given security check include one or more instructions to cause the machine to determine whether a live protected container page group store operation, which is to have been used to store a group of protected container pages including the protected container page out of the protected container memory, is to have been completed.

Example 26 includes the processor of any one of Examples 1 to 16, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to cache or otherwise store instructions including optionally the instruction, an optional L1 data cache to store data, and an optional level 2 (L2) cache to store data and instructions including optionally the instruction. The processor may also optionally include an instruction fetch unit coupled with the decode unit, the L1 instruction cache, and the L2 cache, to fetch instructions including optionally the instruction, in some cases from one of the L1 instruction cache and the L2 cache, and to provide the instruction to the decode unit. The processor may also optionally include a register rename unit to rename registers, an optional scheduler to schedule one or more operations that have been decoded from the instruction for execution, and an optional commit unit to commit execution results of the instruction.

Example 27 includes a system-on-chip that includes at least one interconnect, the processor of any one of Examples 1 to 16 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 28 is a processor or other apparatus operative to perform the method of any one of Examples 17 to 20.

Example 29 is a processor or other apparatus that includes means for performing the method of any one of Examples 17 to 20.

Example 30 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 17 to 20.

Example 31 is a processor or other apparatus substantially as described herein.

Example 32 is a processor or other apparatus that is operative to perform any method substantially as described herein.

Example 33 is a processor or other apparatus that is operative to perform any instruction substantially as described herein.

What is claimed is:

1. A processor comprising:
    a die;
    a decode unit within the die to decode an instruction, the instruction to indicate a source memory location, within a protected memory, where a protected page is to be stored, and the instruction to indicate a destination memory location, outside of the protected memory;
    an execution unit, within the die and coupled with the decode unit, and including at least some circuitry, the execution unit to perform the instruction, wherein to perform the instruction includes to:
    encrypt a copy of the protected page;
    store the encrypted copy of the protected page from the source memory location to the destination memory location, while the protected page remains valid and accessible within the protected memory; and
    configure a value to indicate that the encrypted copy of the protected page was stored out of the protected memory while the protected page remained valid and accessible within the protected memory.

2. The processor of claim 1, wherein the execution unit to perform the instruction is to encrypt the value with the copy of the protected page prior to the encrypted copy of the protected page being stored to the destination memory location.

3. The processor of claim 1, wherein the execution unit to perform the instruction is encrypt the copy of the protected page with a migratable key that is not bound to a platform having the processor and is allowed to be migrated with the encrypted copy of the protected page away from the platform over a network.

4. The processor of claim 1, wherein the execution unit to perform the instruction is perform at least one security check prior to the encrypted copy of the protected page being stored to the destination memory location.

5. The processor of claim 4, wherein the at least one security check comprises a check to ensure that the protected page is write protected.

6. The processor of claim 4, wherein the at least one security check further comprises a check to ensure that any cached address translations for the protected page after it has been write protected, including their access permissions, have been flushed from one or more translation lookaside buffers (TLBs) of the processor after a write protection of the protected page.

7. The processor of claim 1, wherein the execution unit to perform the instruction is update a version of the protected page in a version structure.

8. The processor of claim 7, wherein the version structure is to be used to store both versions of protected pages that are to have been live stored out as well as versions of protected pages that are to have been paged out through paging.

9. The processor of claim 1, wherein the decode unit is to decode the instruction that is to indicate the source memory location, within the protected memory which is to be an enclave page cache, where the protected page which is to be a secure enclave page is to be stored.

10. A processor comprising:
an interface to receive a control primitive, the control primitive to indicate a source memory location, within a protected memory, where a protected page is to be stored, and the control primitive to indicate a destination memory location, outside of the protected memory;
a core coupled with the interface to perform the control primitive, including to:
encrypt a copy of the protected page;
store the encrypted copy of the protected page from the source memory location to the destination memory location, while the protected page remains valid and accessible within the protected memory; and
configure a value to indicate that the encrypted copy of the protected page was stored out of the protected memory while the protected page remained valid and accessible within the protected memory.

11. The processor of claim 10, wherein the core to perform the control primitive is to encrypt the copy of the protected page with a migratable key that is not bound to a platform having the processor and is allowed to be migrated with the encrypted copy of the protected page away from the platform over a network.

12. The processor of claim 10, wherein the core to perform the control primitive is to encrypt the value with the copy of the protected page, prior to the storage of the encrypted copy of the protected page to the destination memory location.

13. The processor of claim 10, wherein the core to perform the control primitive is to update a version of the protected page in a version structure.

14. The processor of claim 10, wherein the core to perform the control primitive is to perform at least one security check prior to the storage of the copy of the protected page to the destination memory location.

15. A method performed by a processor comprising:
accessing a protected page at a source memory location within a protected memory;
encrypting a copy of the protected page;
storing the encrypted copy of the protected page from the source memory location to destination memory location, while the protected page remains valid and accessible within the protected memory; and
configuring a value to indicate that the encrypted copy of the protected page was stored out of the protected memory while the protected page remains valid and accessible within the protected memory.

16. The method of claim 15, wherein said encrypting comprises encrypting the value with the copy of the protected page, prior to said storing the encrypted copy of the protected page to the destination memory location.

17. The method of claim 15, wherein said encrypting comprises encrypting the copy of the protected page with a migratable key, and further comprising migrating the migratable key from a platform having the processor to a destination over a network.

18. The method of claim 15, further comprising performing at least one security check prior to said storing the copy of the protected page to the destination memory location.

19. The method of claim 15, further comprising updating a version of the protected page in a version structure.

20. The method of claim 15, further comprising live migrating the encrypted copy of the protected page from a source computer system having the processor to a destination computer system over a network as part of a live migration.

* * * * *